US012109973B2

(12) United States Patent
Ozeki et al.

(10) Patent No.: US 12,109,973 B2
(45) Date of Patent: Oct. 8, 2024

(54) PEDESTRIAN PROTECTION DEVICE

(71) Applicant: TOYODA GOSEI CO., LTD., Kiyosu (JP)

(72) Inventors: Makoto Ozeki, Kiyosu (JP); Atsushi Kashio, Kiyosu (JP); Hiroki Sakamoto, Kiyosu (JP)

(73) Assignee: TOYODA GOSEI CO., LTD., Aichi-pref. (JP)

( * ) Notice: Subject to any disclaimer, the term of this patent is extended or adjusted under 35 U.S.C. 154(b) by 0 days.

(21) Appl. No.: 18/536,793

(22) Filed: Dec. 12, 2023

(65) Prior Publication Data

US 2024/0217475 A1 Jul. 4, 2024

(30) Foreign Application Priority Data

Dec. 28, 2022 (JP) ................................ 2022-211662

(51) Int. Cl.
*B60R 21/36* (2011.01)
*B60R 21/00* (2006.01)
*B60R 21/2338* (2011.01)

(52) U.S. Cl.
CPC .......... *B60R 21/36* (2013.01); *B60R 21/2338* (2013.01); *B60R 2021/0004* (2013.01); *B60R 2021/23382* (2013.01)

(58) Field of Classification Search
CPC ................ B60R 21/2338; B60R 21/36; B60R 2021/0004; B60R 2021/23382; B60R 2021/346
See application file for complete search history.

(56) References Cited

U.S. PATENT DOCUMENTS 6,923,286 B2 * 8/2005 Sato ........................ B60R 21/36 180/274
6,955,238 B2 * 10/2005 Takimoto ................ B60R 21/36 180/274
7,174,985 B2 * 2/2007 Sawa ...................... B60R 21/36 296/193.11
8,016,066 B1 * 9/2011 Boxey ..................... B60R 21/36 180/274
8,985,257 B2 * 3/2015 Tanaka .................... B60R 21/36 180/274
9,102,306 B2 * 8/2015 Kitte ....................... B60R 21/36
9,346,432 B2 * 5/2016 Sugimoto .............. B60R 21/36
(Continued)

FOREIGN PATENT DOCUMENTS

JP 2017-177967 A 10/2017
JP 2017-177981 A 10/2017
(Continued)

*Primary Examiner* — Laura Freedman
(74) *Attorney, Agent, or Firm* — Posz Law Group, PLC

(57) ABSTRACT

A pedestrian protection device includes a left airbag and a right airbag are of configurations that expand on a left and a right respectively of a wiper pivot disposed centrally in a vehicle width direction. Cowl cover portions of the left airbag and the right airbag that cover an upper face side of a cowl are of a configuration such that end side regions on sides in proximity to each other are caused to come into contact in a position above the wiper pivot. The end side region of one of the cowl cover portions covers the wiper pivot from above in such a way as to be able to restrict contact between a pedestrian and the wiper pivot.

7 Claims, 16 Drawing Sheets

4
5R
5L
51R
51L
40R
40L
6
10R
10L
8a
5a
5a
12L
52R
52L
13R
12R
13L
22R
22L
8
41R
41L
20R
20L
V
3

(56) References Cited

U.S. PATENT DOCUMENTS

| | | | | |
|---|---|---|---|---|
| 10,507,788 | B2 * | 12/2019 | Minei | B60R 21/36 |
| 10,682,978 | B2 * | 6/2020 | Ozeki | B60R 21/36 |
| 10,737,657 | B2 * | 8/2020 | Funahashi | B62D 25/10 |
| 10,807,560 | B2 * | 10/2020 | Funahashi | B60R 21/0134 |
| 2014/0291054 | A1 * | 10/2014 | Tanaka | B60R 21/36 180/274 |
| 2015/0000994 | A1 * | 1/2015 | McLundie | B60R 21/34 180/274 |
| 2019/0077361 | A1 | 3/2019 | Funahashi et al. | |

FOREIGN PATENT DOCUMENTS

| | | | |
|---|---|---|---|
| JP | 2018158646 | A * | 10/2018 |
| JP | 2018172006 | A * | 11/2018 |
| JP | 2021054253 | A * | 4/2021 |

* cited by examiner 4
4a
6
6b
6a
40R
13R(13)
22R
22a
40R
28R
33R
32R
8a(8)
8a(8)
2R
23R
24R
26R 40R
55
52a
80R
81R
40b
40a
52R
51R
65R
83R
84R
66R
69R
86R
85R
67R
41R
50R
LEFTWARD
RIGHTWARD 40R
65R
83R
66R
84R
50R
51R
40a
40b
52R
41R
42R
29R
75a
75c
67R
75R
85R
43R
80R
81R
44R
45a
31R
28R
45R
75b
69R
86R
52a
RIGHTWARD
LEFTWARD 40L
51L
65L
83L
66L
84L
41L
LEFTWARD
81L
80L
40a
40b
69L
86L
67L
85L
42L
52L
52b
60a
60
RIGHTWARD 4
51R
40R
52R
4a
6
6a
67R
22a
75R
28R
8a(8)
22R
20R
26R
41R
M 52L(40L)
LEFTWARD
55
69L
60
69R
12a
10R
60a
12R
6b(6)
40a
40b
52R(40R)
RIGHTWARD 52L(40L)
55a
55A
69L
60
69R
12a
10R
12R
6b(6)
92
52AR(40AR)
LEFTWARD
RIGHTWARD 97L
98L
101L
97b
97a
99L
99a
99a
99R
98R
97R
101R
97a
97b 98L(97L)
101L
99L
99a
12a
6b(6)
12R
10R
99a
99R
97a
101R
97b
98R(97R)
LEFTWARD
RIGHTWARD

PEDESTRIAN PROTECTION DEVICE

CROSS REFERENCE TO RELATED APPLICATIONS

The present application claims priority from Japanese Patent Application No. 2022-211662 of Ozeki et al., filed on Dec. 28, 2022, the entire disclosures of which are incorporated herein by reference.

BACKGROUND

1. Technical Field

The present disclosure relates to a pedestrian protection device disposed in a vicinity of a rear end of a hood panel in a vehicle.

2. Description of Related Art

A device shown in JP2017-177967 is already known as a pedestrian protection device disposed in a vicinity of a rear end of a hood panel of a vehicle. The existing pedestrian protection device is such that a mounting space in a vehicle is divided into left and right in order to achieve compactness, and the device includes a left airbag and a right airbag that are arranged in parallel on vehicle width direction sides when inflation is completed. Specifically, the existing pedestrian protection device is such that the left airbag expands on a left of a wiper pivot disposed centrally in the vehicle width direction of a left and right pair of wipers. Also, the right airbag expands on a right of the wiper pivot. Further, each of the left airbag and the right airbag has a cowl cover portion that is disposed in such a way as to approximately follow the vehicle width direction when inflation is completed, and covers a cowl from above. The two cowl cover portions cover the cowl from above over approximately a whole length by ends on sides in proximity to each other being brought into proximity with each other.

The existing pedestrian protection device is such that the cowl cover portion of the right airbag is of a configuration such as to extend to the left of the wiper pivot, and covers the wiper pivot from above when inflation is completed. The cowl cover portion of the left airbag is of a configuration such that an end is positioned on the left of the wiper pivot. Also, the existing pedestrian protection device is such that each of the folded right airbag or left airbag is housed in a case provided on a lower face side in a vicinity of the rear end of the hood panel. When operating, each of the left airbag and the right airbag expands in such a way as to protrude from the case moved upward together with the hood panel, which is in a state in which a rear end side has been lifted up by an operation of an actuator. This means that even when an upper end of the wiper pivot partially protrudes farther upward than an upper face of the cowl, the wiper pivot can be covered unimpeded from above by the cowl cover portion of the right airbag. However, in the case of a configuration in which the folded airbags (the left airbag and the right airbag) are housed in a position below the rear end side of the hood panel (lower than the upper face of the cowl), the following problem occurs when the left airbag and the right airbag are of the same configuration. A region on an end side of the cowl cover portion rides up onto the wiper pivot partially protruding from the upper face of the cowl, and there is concern that the cowl cannot smoothly be extensively covered from above.

SUMMARY

A pedestrian protection device of the present disclosure includes the following:

- a left airbag and a right airbag that are disposed in a vicinity of a rear end of a hood panel in a vehicle, and are arranged in parallel on vehicle width direction sides when inflation of each is completed, wherein
- the left airbag includes a left cowl cover portion that is disposed approximately following the vehicle width direction and covers an upper face side of a cowl when inflation is completed, and
- the right airbag includes a right cowl cover portion that is disposed approximately following the vehicle width direction and covers the upper face side of the cowl when inflation is completed, and wherein
- the left airbag and the right airbag are of configurations that expand on a left and a right of a wiper pivot disposed centrally in the vehicle width direction of a left and right pair of wipers,
- the left cowl cover portion and the right cowl cover portion are of a configuration such that end side regions on sides in proximity to each other are caused to come into contact in a position above the wiper pivot when inflation is completed, and
- the end side region of at least one of the left cowl cover portion and the right cowl cover portion is of a configuration that covers the wiper pivot from above in such a way as to be able to restrict contact between a pedestrian and the wiper pivot when inflation is completed.

DETAILED DESCRIPTION

Preferred embodiments of the present invention are described below with reference to the accompanying drawings. However, the invention is not limited to the embodiments disclosed herein. All modifications within the appended claims and equivalents relative thereto are intended to be encompassed in the scope of the claims.

Figure 1:
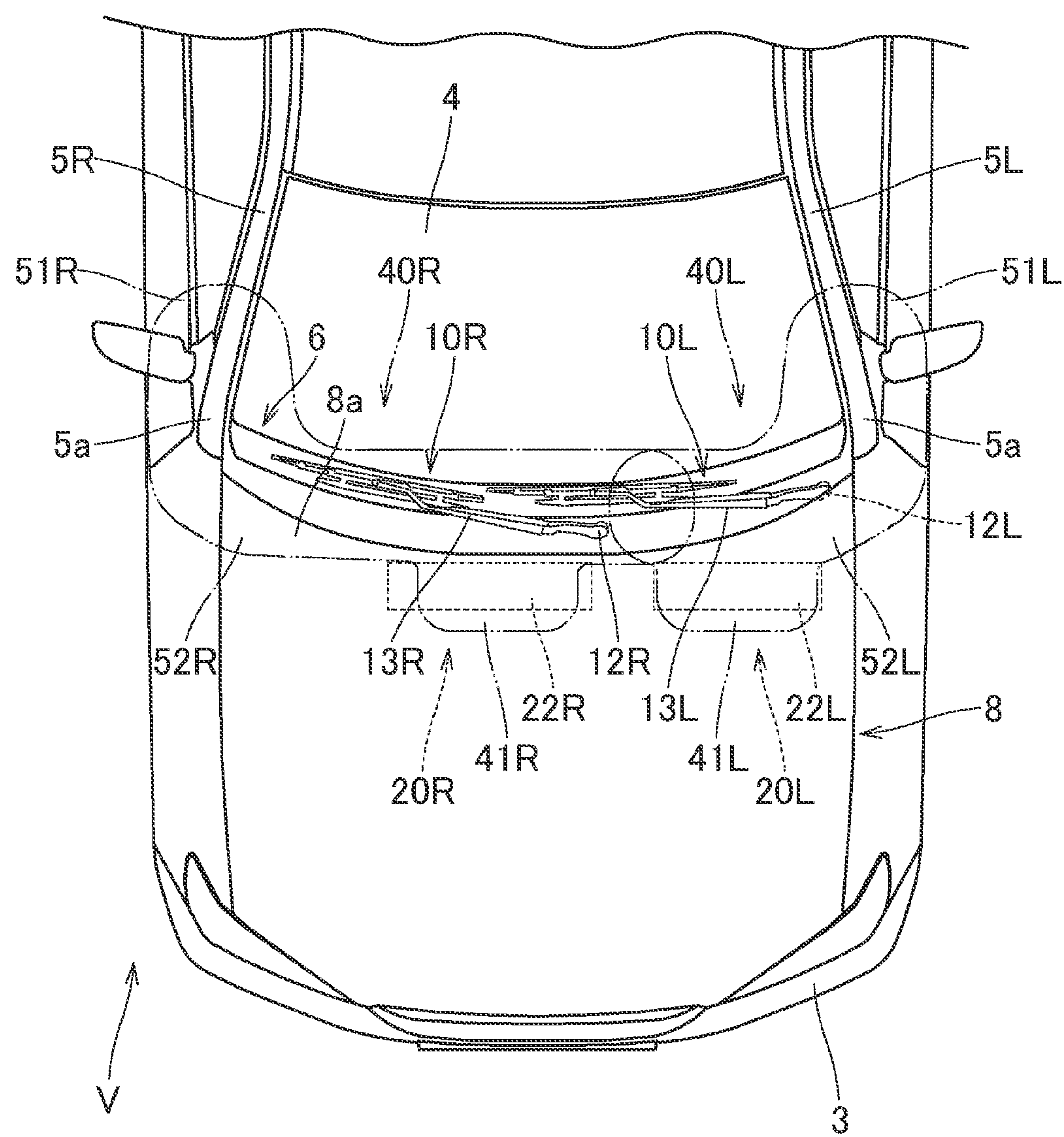
FIG. 1 is a plan view of a vehicle in which a pedestrian protection device that is one embodiment of the present disclosure is mounted.

Hereafter, an embodiment of the present disclosure will be described based on the drawings. A pedestrian protection device M of the embodiment is mounted in a vehicle V, which is a so-called left-hand drive vehicle in which a driver's seat is disposed on a left side, as shown in FIG. 1. Specifically, the pedestrian protection device M includes two airbag devices 20L and 20R. As shown in FIG. 1, a left and right pair of wipers 10L and 10R are disposed in the vehicle V below a rear end 8*a* side of a hood panel 8, and in the case of the embodiment, in a region of a cowl 6. In the embodiment, the two airbag devices 20L and 20R are disposed one each on left and right sides either side of a wiper pivot 12R, to be described hereafter, of the wiper 10R, which is disposed on a right side (a passenger seat side). In the present embodiment, unless particularly stated otherwise, front-rear, up-down, and left-right directions are described as coinciding with front-rear, up-down, and left-right directions respectively of the vehicle V.

The cowl 6 is configured of a cowl panel 6*a* of high rigidity on a body side, and a cowl louver 6*b* made of a synthetic resin above the cowl panel 6*a*.

Figure 2:
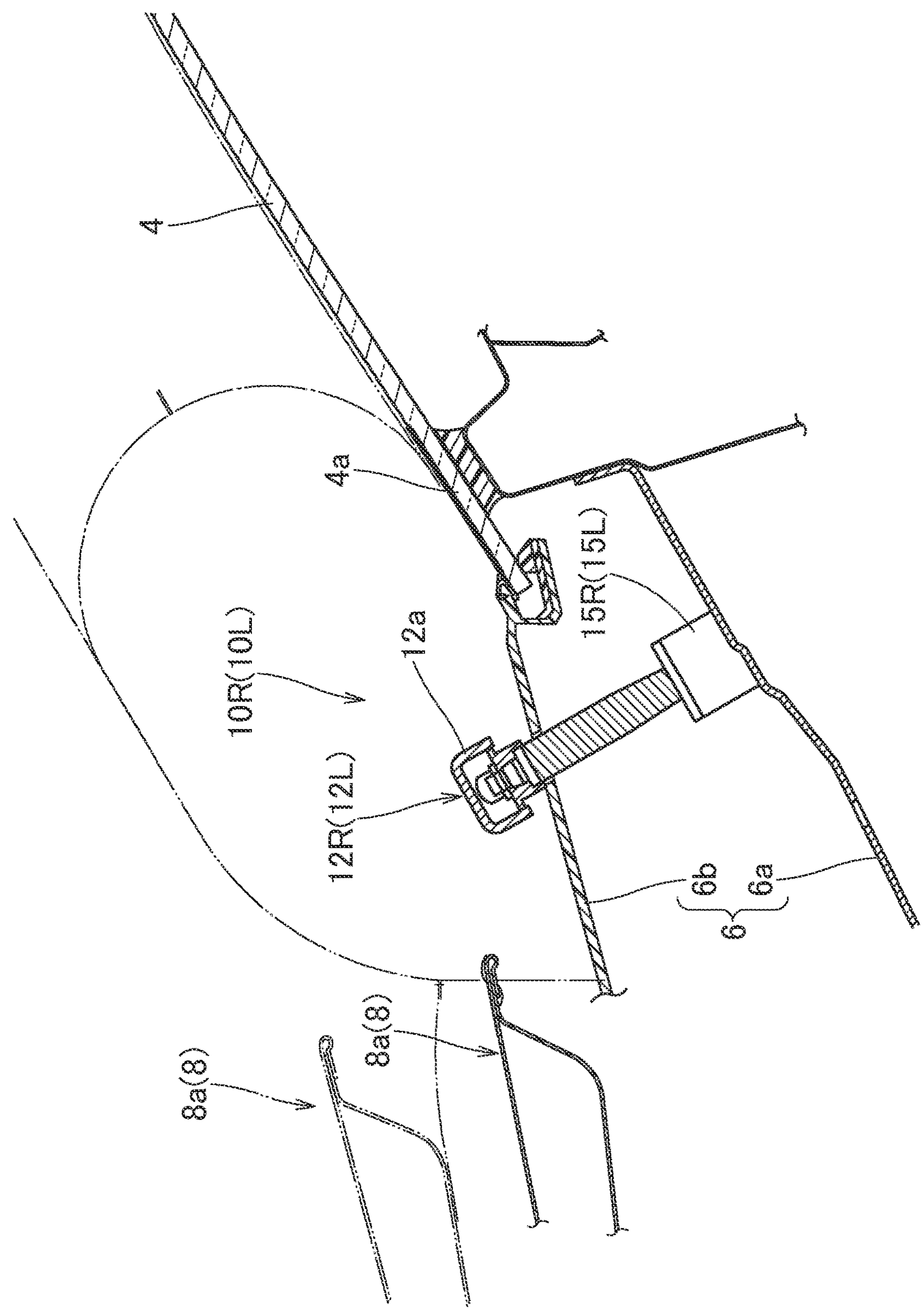
FIG. 2 is a schematic vertical sectional view showing a wiper pivot disposition region in the vehicle of FIG. 1.

The wipers 10L and 10R are a left and right pair. As shown in FIGS. 1 and 2, the wipers 10L and 10R include, respectively, wiper main bodies 11L and 11R which are disposed on an upper side of the cowl louver 6*b*, and drive mechanisms 15L and 15R which are disposed below the cowl louver 6*b* and drive the wiper main bodies 11L and 11R. The wiper main bodies 11L and 11R include wiper pivots 12L and 12R which are coupled to the drive mechanisms 15L and 15R, and elongated arm portions 13L and 13R. Base portion sides of the arm portions 13L and 13R are coupled to the wiper pivots 12L and 12R in such a way as to be able to pivot freely. Specifically, the arm portions 13L and 13R are coupled to upper end 12*a* sides of the wiper pivots 12L and 12R. As shown in FIG. 2, the upper ends 12*a* of the wiper pivots 12L and 12R protrude above the cowl louver 6*b*. Further, in the case of the embodiment, the wiper pivot 12R of the wiper 10R disposed on the right side (the passenger seat side) is disposed centrally in a vehicle width direction (the left-right direction). Specifically, the wiper pivot 12R of the wiper 10R on the right side is disposed in a position slightly to the left of center in the vehicle width direction (the left-right direction) of the cowl 6 (refer to FIG. 1).

Each of the two airbag devices 20L and 20R is disposed in a position that is below a vicinity of the rear end 8*a* of the hood panel 8. Specifically, the airbag devices 20L and 20R are disposed neighboring in positions on a front side of the cowl panel 6*a* (refer to FIG. 3). That is, each airbag device 20L and 20R is disposed in a position that is lower than an upper face of the cowl 6. Specifically, as shown in FIG. 1, the left airbag device 20L disposed on the left side (the driver's seat side) is disposed in a region between the wiper pivots 12L and 12R. The right airbag device 20R disposed on the right side (the passenger seat side) is disposed in a position that is to the right of the wiper pivot 12R, as shown in FIG. 1. The left airbag device 20L and the right airbag device 20R are of the same configuration except that forms of the left airbag 40L and the right airbag 40R when inflation is completed differ slightly, and sizes of the actual devices (sizes of cases 22L and 22R, to be described hereafter, or more specifically, width dimensions between left-right direction sides of the cases 22L and 22R, refer to FIG. 1) are slightly different. Because of this, a description will be given by adding L or R after identical reference signs. In the embodiment, a description will be given taking mainly the right airbag device 20R disposed on the right side (the passenger seat side) as an example. In the embodiment, the rear end 8*a* side of the hood panel 8 is lifted upward by an unshown actuator when the left airbag device 20L and the right airbag device 20R operate (refer to FIGS. 2 and 3).

The right airbag device 20R includes the right airbag 40R, an inflator 28R that supplies an inflating gas to the right airbag 40R, the case 22R as a housing region that houses the folded right airbag 40R and the inflator 28R, and an airbag cover 26R that covers the folded right airbag 40R.

The case 22R is made of metal (made of sheet metal), and is fixed to an attachment portion 2R configured of a flange or the like that extends from the cowl panel 6*a* on a body 1 side of the vehicle V. Specifically, the case 22R is fixed to the attachment portion 2R by utilizing a bolt 32R and a nut 33R of an attachment bracket 31R of the inflator 28R (refer to FIG. 3). The case 22R is of an approximately cuboid box form that has, on an upper end side, a protrusion aperture 22*a* for causing the right airbag 40R to protrude when expanding. The case 22R includes a bottom wall portion 23R of an approximately rectangular plate form, which extends approximately following the left-right direction (the vehicle width direction) of the vehicle V, and a peripheral wall portion 24R of an approximately rectangular tube form, which extends upward from an outer peripheral edge of the bottom wall portion 23R. The case 22R is disposed on a front end side of the cowl 6 below the rear end 8*a* of the hood panel 8. More specifically, the case 22R is disposed in a position that is farther forward than the wiper pivot 12R, and in proximity to the wiper pivot 12R on the right side (refer to FIG. 1). Also, as shown in FIG. 3, the arm portion 13R of the wiper 10R on the right side is disposed in a region of the cowl 6 on the rear side of the case 22R.

The airbag cover 26R covers the protrusion aperture 22*a* of the case 22R. The airbag cover 26R is approximately flush with the cowl louver 6*b*, and is disposed in such a way as to extend forward from the cowl louver 6*b*. The airbag cover 26R is attached to a region of the case 22R on a front side of the peripheral wall portion 24R. When the right airbag 40R housed in the case 22R expands, the airbag cover 26R is pushed open by the right airbag 40R.

Figure 3:
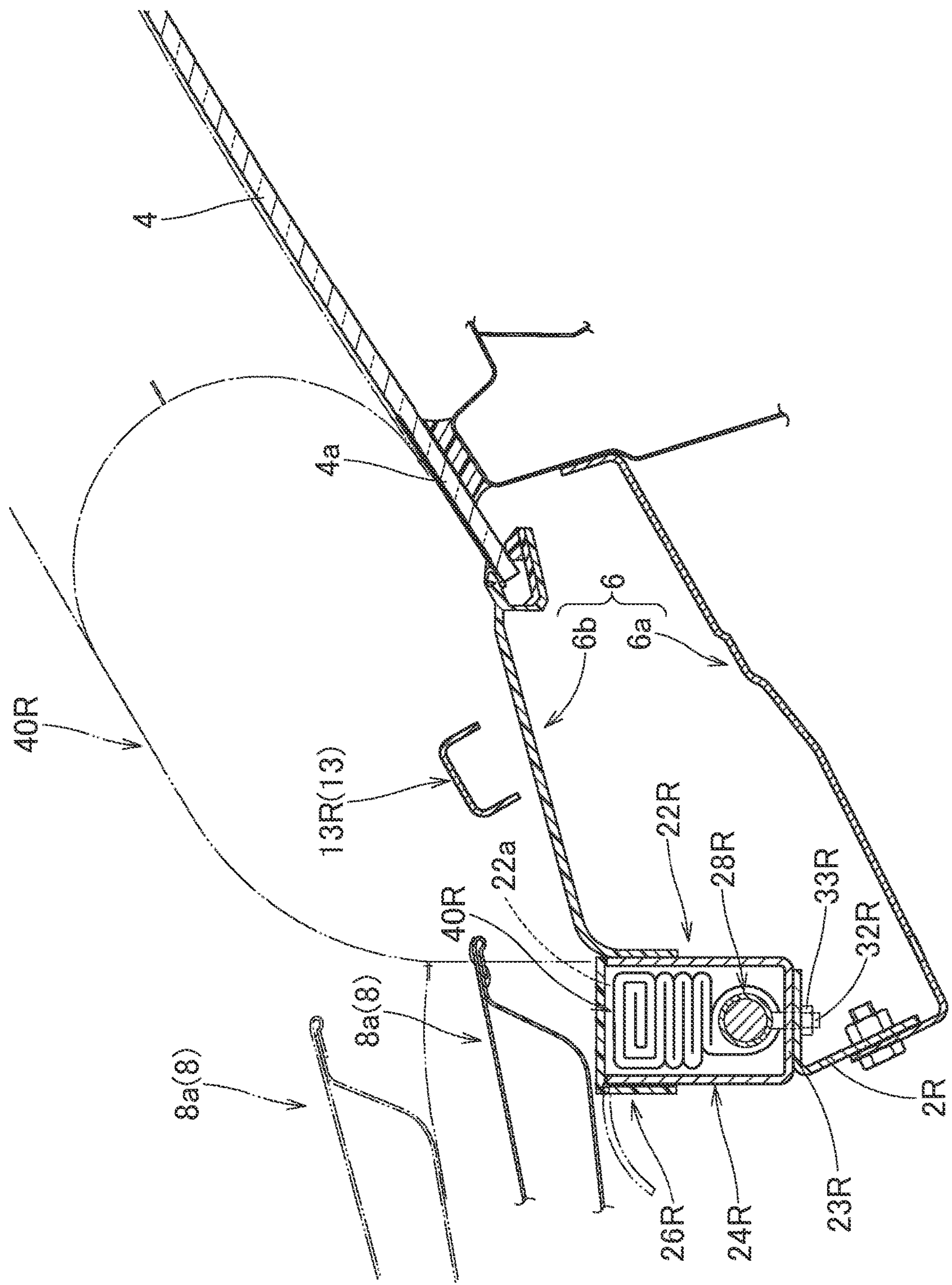
FIG. 3 is a schematic vertical sectional view showing a right airbag device in the pedestrian protection device of the embodiment.
Figure 5:
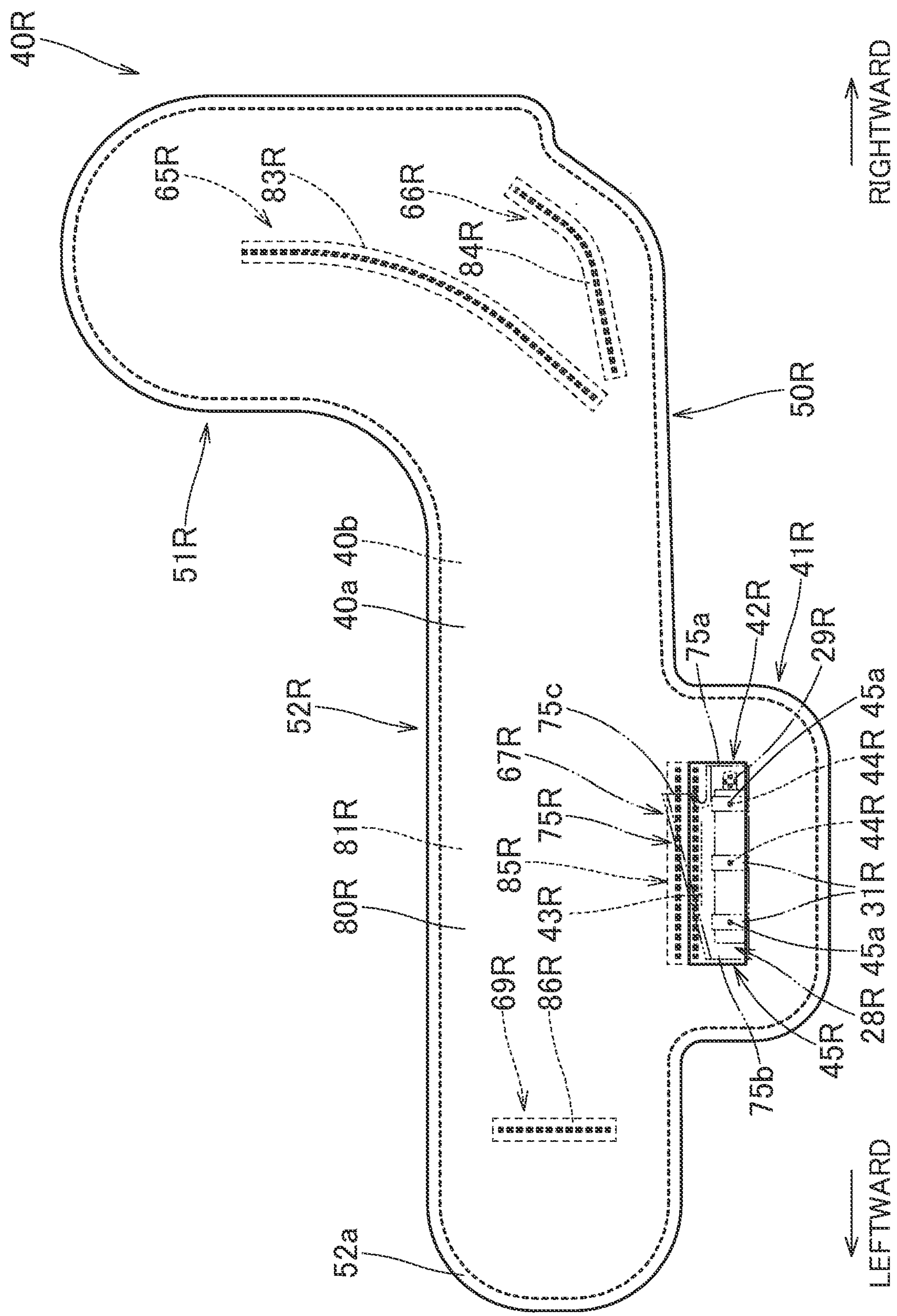
FIG. 5 is a bottom view of the right airbag of FIG. 4.

As indicated by two-dot chain lines in FIGS. 3 and 5, the inflator 28R is of an approximately cylindrical form disposed in such a way that an axial direction approximately follows the left-right direction (the vehicle width direction)

of the vehicle V. A gas discharging portion 29R that discharges inflating gas is disposed on a leading end side (in the case of the embodiment, a right end side) of the inflator 28R. In the case of the embodiment, the inflator 28R is held in a multiple (three in the case of the embodiment) of the attachment bracket 31R, and is inserted into the right airbag 40R in a state in which a periphery is enveloped in an inner tube 75R. Further, the inflator 28R is fixed to the bottom wall portion 23R of the case 22R by utilizing the bolt 32R of the attachment bracket 31R (refer to FIG. 3). As heretofore described, the bolt 32R of the attachment bracket 31R penetrates the bottom wall portion 23R, and is fastened to the attachment portion 2R on the body 1 side of the vehicle V using the nut 33R. That is, the bolt 32R of the attachment bracket 31R fixes the case 22R to the attachment portion 2R together with the inflator 28R (refer to FIG. 3). Also, when attaching to the attachment portion 2R of the attachment bracket 31R, the right airbag 40R is also attached and fixed to the bottom wall portion 23R of the case 22R. This is because the inflator 28R is in a state inserted into the right airbag 40R. The inflator 28R is configured in such a way as to operate when a collision between the vehicle V and a pedestrian is detected by an unshown sensor provided in a front bumper 3 of the vehicle V.

Figure 7:
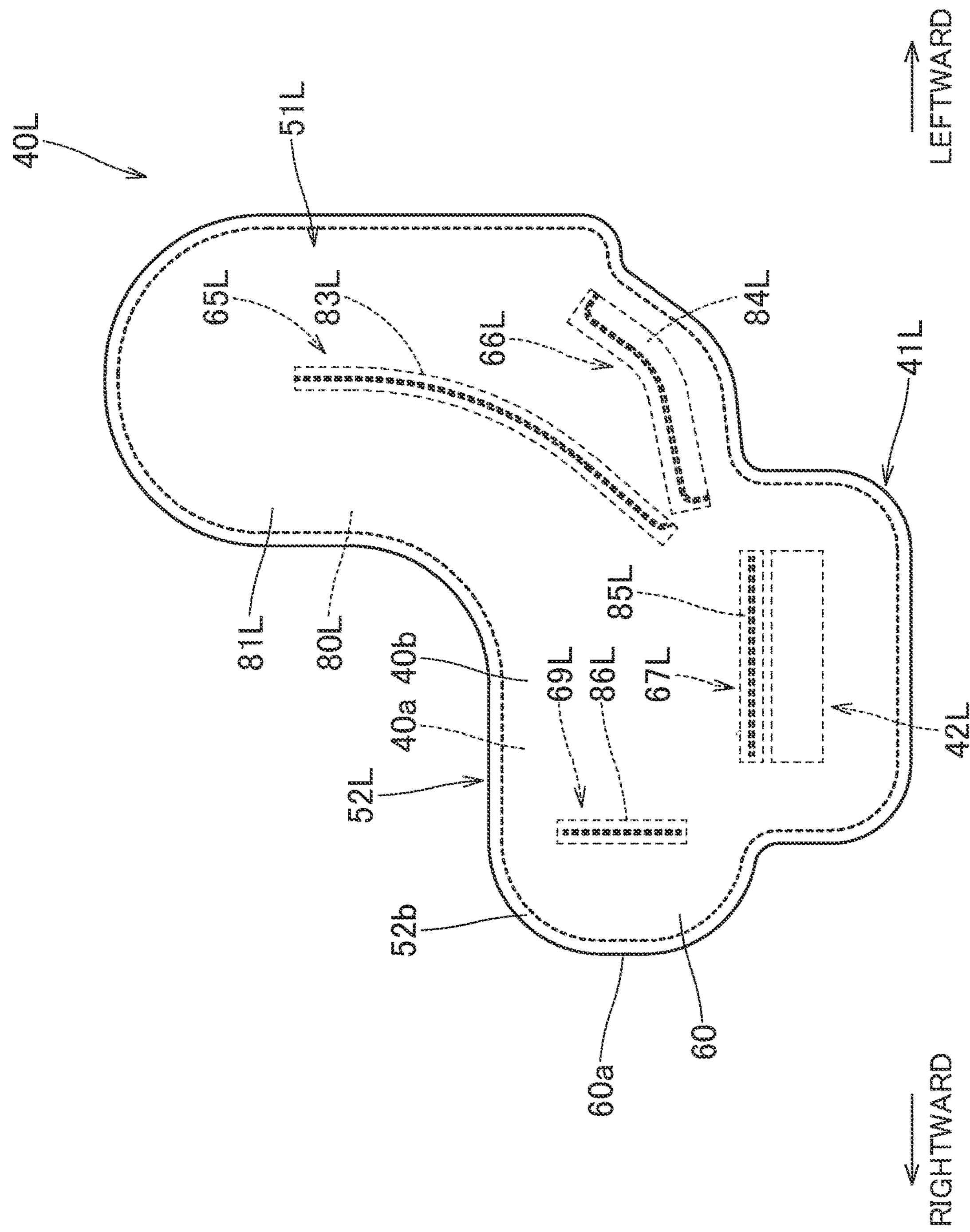
FIG. 7 is a plan view of a left airbag used in a left airbag device in a flattened state.

The right airbag 40R and the left airbag 40L are configured in such a way that length dimensions of a left cowl cover portion 52L and a right cowl cover portion 52R, to be described hereafter, and disposition positions of case side regions 41L and 41R, to be described hereafter, with respect to the left cowl cover portion 52L and the right cowl cover portion 52R, differ slightly. However, the right airbag 40R and the left airbag 40L are such that basic configurations are approximately the same, simply being disposed in such a way as to have bilateral symmetry (refer to FIGS. 4 and 7). Because of this, L or R will be added after identical reference signs for identical members in the right airbag 40R and the left airbag 40L, and a description will be omitted as appropriate.

Figure 4:
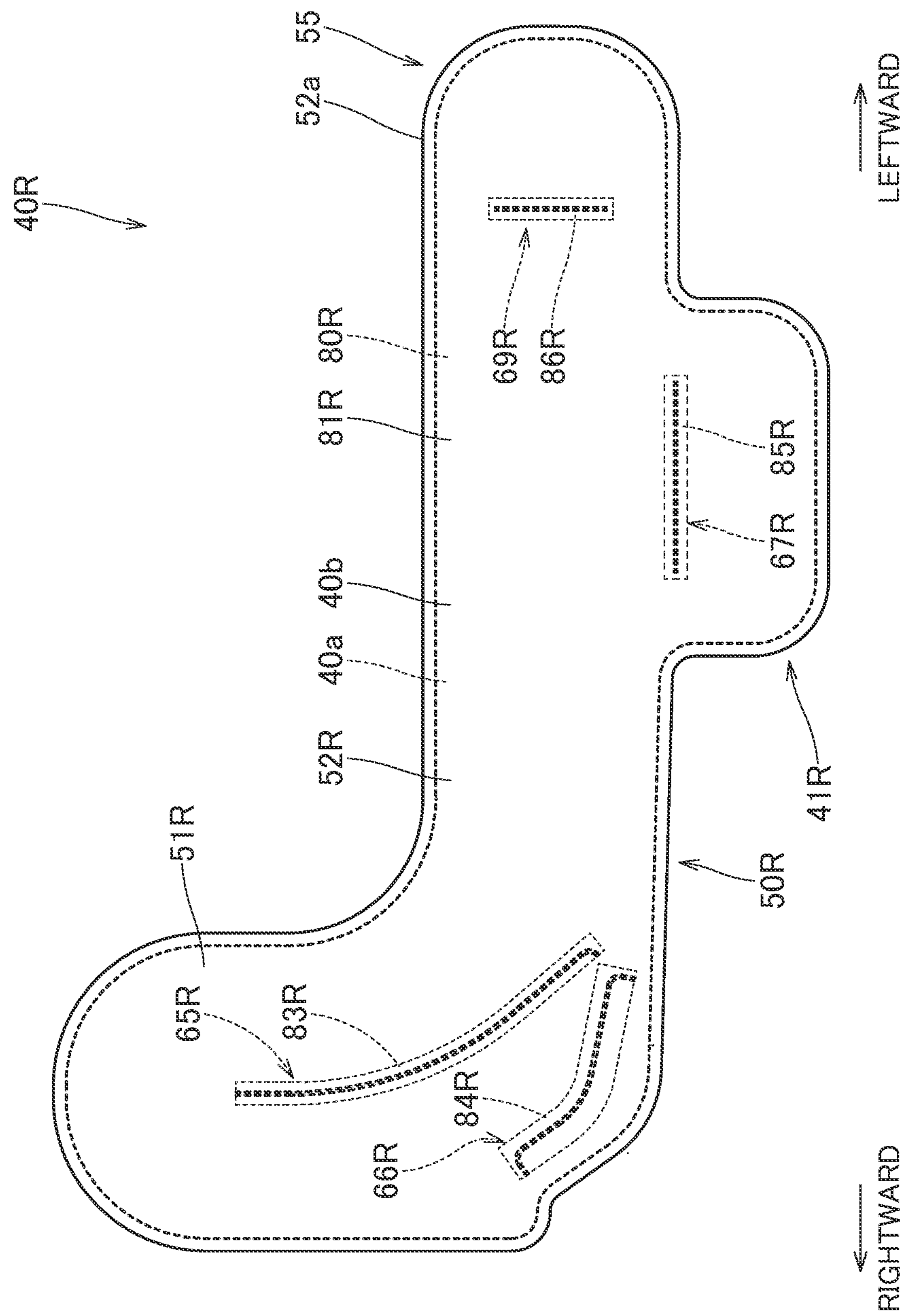
FIG. 4 is a plan view of a right airbag used in a right airbag device in a flattened state.

As shown in FIGS. 4 and 5, the right airbag 40R includes the case side region 41R and a main body expanding portion 50R. The case side region 41R is a region disposed from the case 22R side to a lower face side of the rear end 8*a* of the hood panel 8 when inflation of the right airbag 40R is completed. The main body expanding portion 50R is a region disposed in such a way as to extend rearward from the case 22R when inflation of the right airbag 40R is completed. Also, the right airbag 40R has a vehicle body side wall portion 40*a* which is disposed on the body 1 side when inflation is completed, and a pedestrian side wall portion 40*b* disposed opposing the vehicle body side wall portion 40*a*. External forms of the vehicle body side wall portion 40*a* and the pedestrian side wall portion 40*b* are approximately the same. Further, the right airbag 40R is formed in a bag form by outer peripheral edges of the vehicle body side wall portion 40*a* and the pedestrian side wall portion 40*b* being joined (sewn) to each other over a whole periphery.

The case side region 41R is formed in such a way as to extend forward from the right cowl cover portion 52R, to be described hereafter, of the main body expanding portion 50R. The case side region 41R is attached to the case 22R in a region on a rear end side (the main body expanding portion 50R side) when inflation is completed. Further, the case side region 41R is of a configuration such as to cover from above a region on a forward side from directly above the case 22R, that is, a vicinity of the rear end 8*a* of the hood panel 8 from below, when inflation is completed (refer to FIG. 10). The case side region 41R is configured to be of a smaller width (a left-right direction width dimension is set to be smaller) than the right cowl cover portion 52R of the main body expanding portion 50R. That is, the case side region 41R is formed in such a way as to partially protrude forward from the right cowl cover portion 52R. A width dimension between left-right direction sides (vehicle width direction sides) of the case side region 41R is set to be slightly smaller than a width dimension between left-right direction sides of the case 22R (refer to FIG. 9). An insertion aperture portion 42R for inserting the inflator 28R into an interior is formed in a region configuring a rear end side of the case side region 41R in the vehicle side wall portion 40*a* (refer to FIG. 5). The insertion aperture portion 42R includes an insertion slit 43R, three insertion holes 44R, and a cover panel 45R that blocks off the insertion slit 43R from an outer peripheral side. The insertion slit 43R is a slit for inserting the inflator 28R, in a state in which the outer peripheral side is enveloped in the inner tube 75, into the right airbag 40R. The insertion slit 43R is formed in an approximately linear form approximately following the left-right direction. Each of the insertion holes 44R is a hole for inserting the bolt 32R of the attachment bracket 31R. The insertion holes 44R are formed in a region farther to the front side than the insertion slit 43R (refer to FIGS. 5 and 6). The cover panel 45R covers an outer surface side of the insertion slit 43R. A rear edge side of the cover panel 45R is joined to the vehicle body side wall portion 40*a* on a rear side of the insertion slit 43R. Three attachment holes 45*a* for causing the bolts 32R of the attachment brackets 31R to protrude are formed on a front end side of the cover panel 45R. The attachment holes 45*a* are formed corresponding to the insertion holes 44R (refer to FIGS. 5 and 6).

An external form of the main body expanding portion 50R when inflation is completed is an approximate L form as seen from the front side. The main body expanding portion 50R includes the right cowl cover portion 52R and a pillar cover portion 51R. The right cowl cover portion 52R is a region disposed approximately following the left-right direction (the vehicle width direction) in such a way as to approximately follow a lower portion 4*a* of a front windshield 4. The pillar cover portion 51R is a region that extends rearward from an end portion (a right end) on a vehicle width direction outer side of the right cowl cover portion 52R, and covers a lower portion 5*a* side of a front face of a front pillar 5R on the right side. In the case of the embodiment, the pillar cover portion 51R is wider than the right cowl cover portion 52R in a state in which the right airbag 40R is flattened. Further, the pillar cover portion 51R is configured in such a way as to be able to extensively cover the front face lower portion 5*a* side of the front pillar 5R on the right side (refer to FIGS. 4, 5, and 9).

The right cowl cover portion 52R is configured in such a way as to cover an upper face side (a front face side) from the cowl 6 to the lower portion 4*a* side of the front windshield 4 when inflation of the right airbag 40R is completed. Specifically, when inflation of the right airbag 40R is completed, the right cowl cover portion 52R covers a region from a right end of the cowl 6 to a region on the left of the wiper pivot 12R of the wiper 10R on the right side (refer to FIG. 9). Specifically, the right cowl cover portion 52R is of a configuration such that a region of the left airbag 40L side (specifically, a left end side region 55) is caused to come into contact with a right end side region 60 of the left cowl cover portion 52L in the left airbag 40L when inflation is completed in a state mounted in a vehicle. The left end side region 55 is a region which is a side in proximity to the left cowl cover portion 52L of the left airbag 40L, that is, a region on a left end 52*a* side of the right cowl cover portion 52R. More specifically, in the case of the embodiment, the left end side region 55 of the right cowl cover portion 52R is configured in such a way as to cover from above a region from the wiper pivot 12R to the right end side region 60 of the left airbag 40L when inflation of the left airbag 40L and the right airbag 40R is completed. The right end side region 60 is expanded on the left of the wiper pivot 12R. Specifically, the left end side region 55 is of a configuration such as to extend to the rear of a right end side of the case side region 41L in the left airbag 40L when inflation of the left airbag 40L and the right airbag 40R is completed (refer to FIG. 9). Also, when receiving a pedestrian when inflation of the left airbag 40L and the right airbag 40R is completed, a lower face side of the left end side region 55 is supported by the right end side region 60 of the left airbag 40L. Further, the left end side region 55 is configured in such a way that contact between the pedestrian and the wiper pivot 12R when receiving the pedestrian can be restricted.

Figure 6:
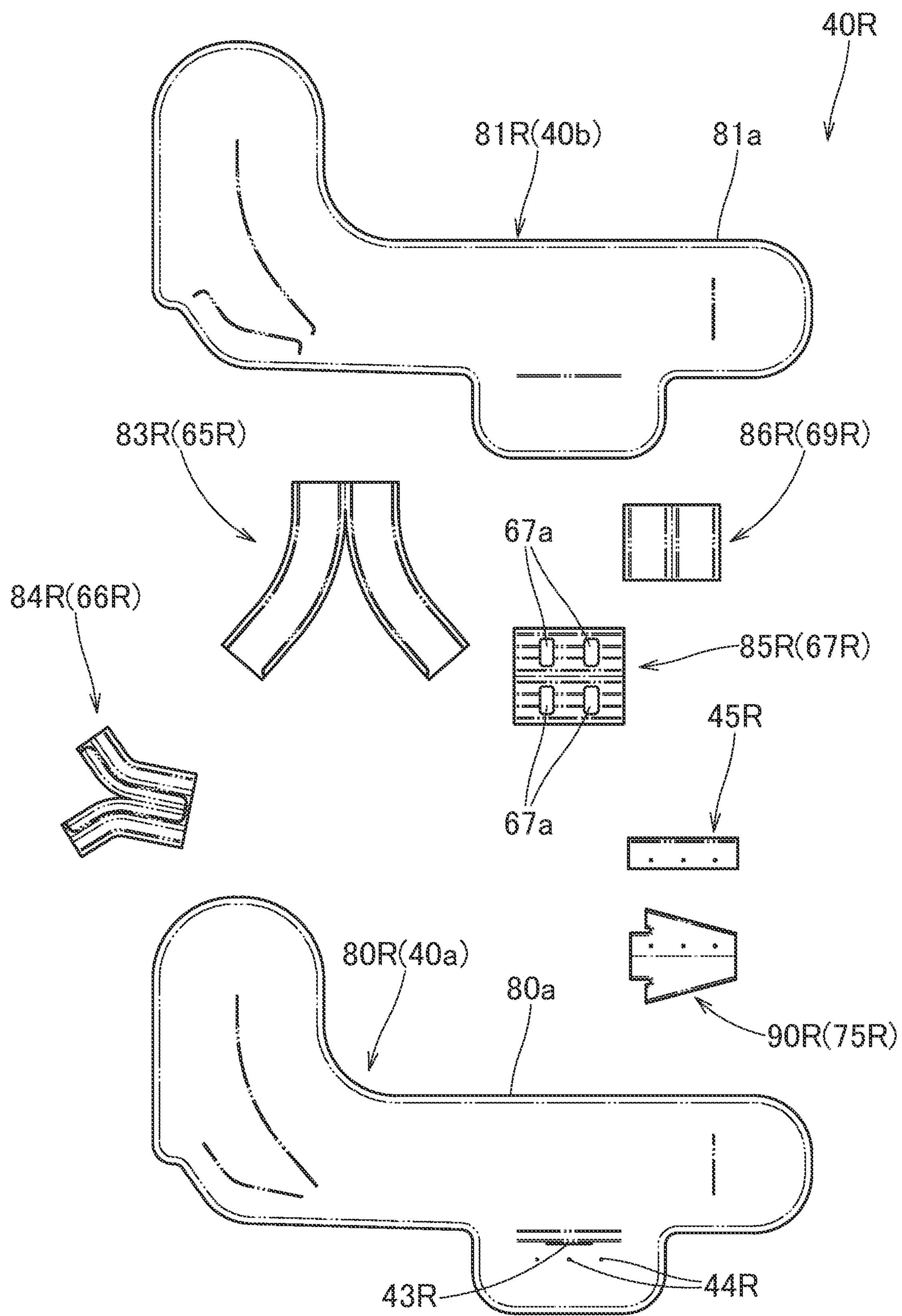
FIG. 6 is a plan view in which base members configuring the right airbag of FIG. 4 are arrayed.
Figure 10:
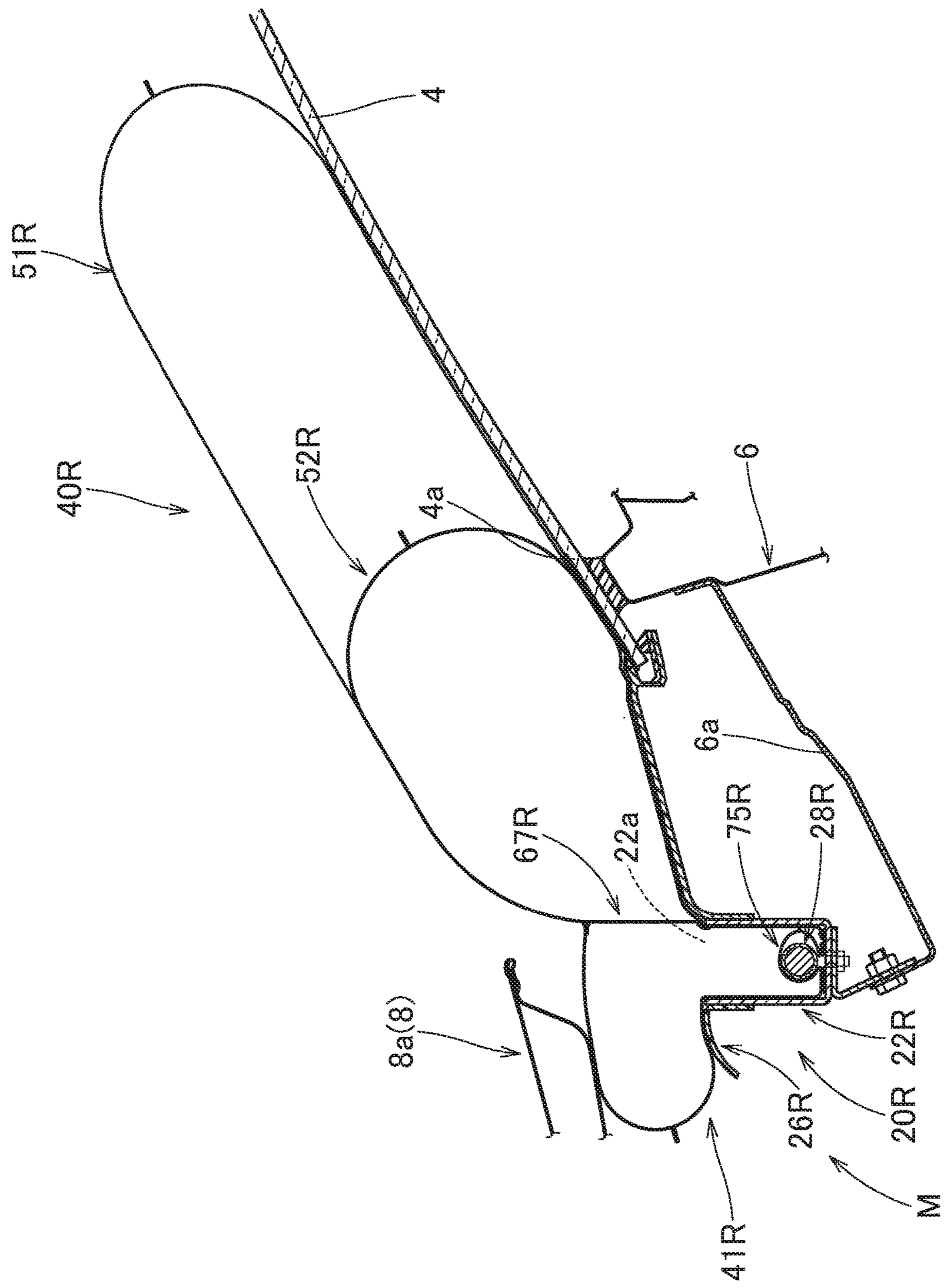
FIG. 10 is a schematic vertical sectional view showing a state in which inflation of the right airbag is completed in the pedestrian protection device of the embodiment.

Also, in the embodiment, tethers 65R, 66R, 67R, and 69R are disposed in the interior of the right airbag 40R (refer to FIGS. 4 to 6). The tethers 65R, 66R, 67R, and 69R link the pedestrian side wall portion 40*b* and the vehicle body side wall portion 40*a*, and regulate a thickness of the right airbag 40R when inflation is completed. The tether 65R is disposed in the pillar cover portion 51R excepting a rear end side. Specifically, the tether 65R is disposed continuously in a position that is approximately central in a width direction of the pillar cover portion 51R. The tether 66R is partially disposed on a front edge side in a vicinity of a boundary region between the right cowl cover portion 52R and the pillar cover portion 51R. The tether 67R is disposed in a vicinity of a boundary region between the case side region 41R and the right cowl cover portion 52R (the main body expanding portion 50R). The tether 67R is disposed approximately following the left-right direction in such a way as to partially block off the boundary region. Also, a multiple (two in the case of the embodiment) of apertures 67*a* formed in an approximately rectangular form are arranged in parallel on left-right direction sides in the tether 67R (refer to FIG. 6). A length dimension of the tether 67R is set to be smaller than a width dimension between left-right direction sides of the case side region 41R in a flattened state. Inflating gas that has flowed into the case side region 41R flows into the main body expanding portion 50R from a gap formed on both end sides of the tether 67R and the two apertures 67*a* and 67*a*. The tether 69R is disposed in a region of the left end side region 55 in the right cowl cover portion 52R. The tether 69R is disposed in such a way as to approximately follow the front-rear direction. Specifically, as shown in FIG. 10, the tether 69R is disposed in a position farther to the left than the wiper pivot 12R (in a region that coincides vertically with the right end side region 60, to be described hereafter, of the left cowl cover portion 52L in the left airbag 40L) when inflation is completed. The tether 69R configures a thickness regulating member. Owing to the tether 69R being disposed, the left end side region 55 is restricted from expanding to an excessive thickness, and is of a plate form when inflation of the right airbag 40R is completed.

The inner tube 75R that covers the outer peripheral side of the inflator 28R is configured as indicated by two-dot chain lines in FIG. 5. The inner tube 75R has an insertion tube portion 75*c* in which the inflator 28R to which the attachment bracket 31R has been attached is inserted. Also, the inner tube 75R has a region that extends to both sides from a disposition region of the gas discharging portion 29R in the insertion tube portion 75*c*, and is of an approximate three-way tubular form. Outflow ports 75*a* and 75*b* for causing inflating gas to flow out are disposed on a leading end side of this region. Three attachment holes (reference sign omitted) through which the bolt 32R of each attachment bracket 31R is inserted are formed in the insertion tube portion 75*c*. The inner tube 75R is configured of a tube base member 90R such as that shown in FIG. 6.

As shown in FIG. 6, the right airbag 40R of the embodiment is configured of a vehicle body side panel 80R configuring the vehicle body side wall portion 40*a*, a pedestrian side panel 81R configuring the pedestrian side wall portion 40*b*, tether base members 83R, 84R, 85R, and 86R configuring the tethers 65R, 66R, 67R, and 69R respectively, and the tube base member 90R configuring the inner tube 75R. These base members are configured by a coated fabric in which a gas leak-preventing coating agent is applied to a surface of a woven fabric formed by weaving a polyamide-based material, a polyester-based material, or the like, and are formed by the coated fabric being cut into a predetermined form.

Figure 9:
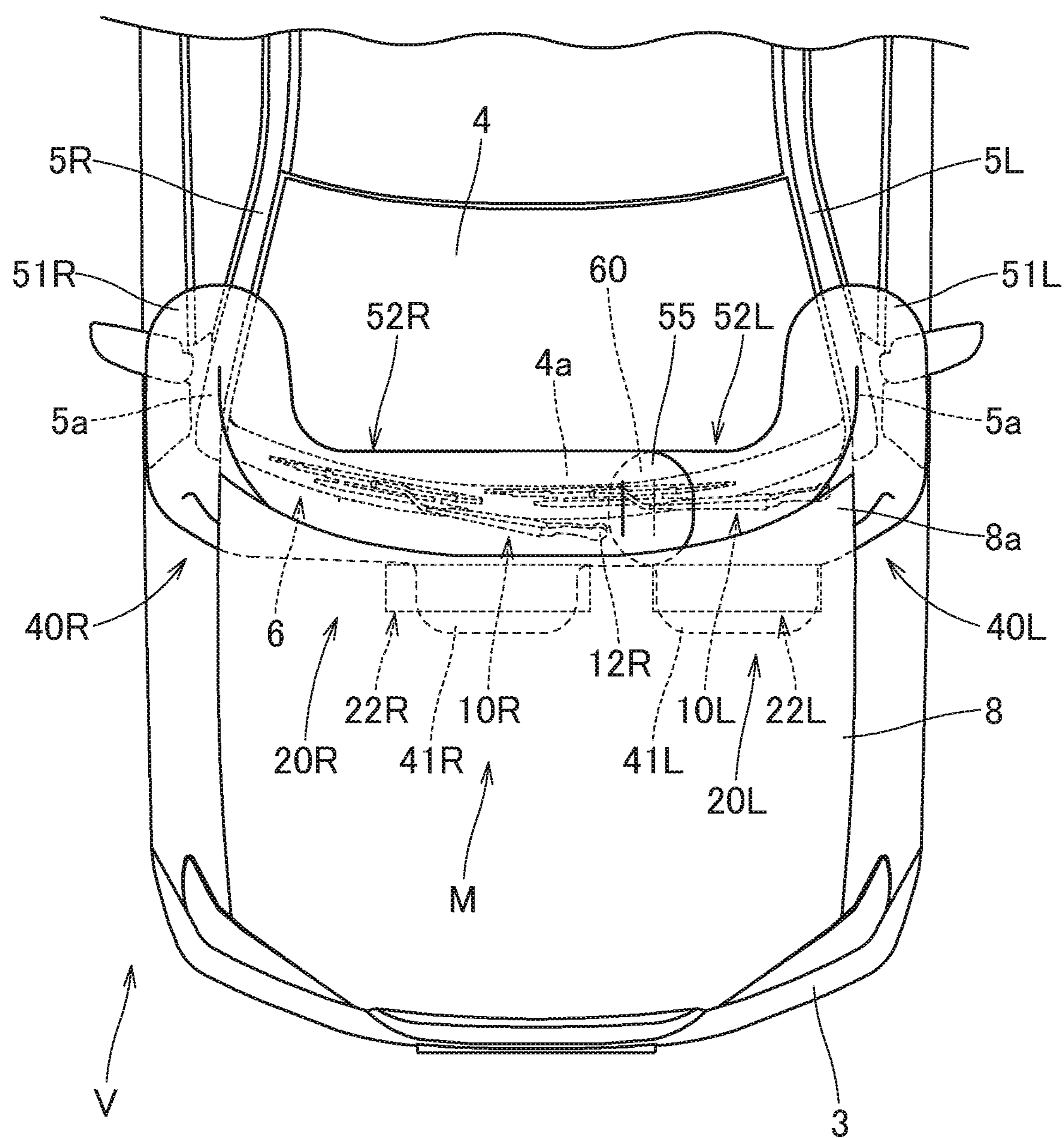
FIG. 9 is a plan view of a vehicle showing a state in which inflation of the left airbag and the right airbag is completed in the pedestrian protection device of the embodiment.

As shown in FIG. 9, the left cowl cover portion 52L in the left airbag 40L is of a configuration that covers a region from a left end of the cowl 6 to the left of the wiper pivot 12R of the wiper 10R on the right side when inflation of the left airbag 40L is completed. The left cowl cover portion 52L is of a configuration such that the right end side region 60, which is a region on the right airbag 40R side, is caused to come into contact with the left end side region 55 of the right cowl cover portion 52R in the right airbag 40R when inflation is completed in a state mounted in a vehicle. Specifically, the right end side region 60 is a region which is a side in proximity to the right cowl cover portion 52R of the right airbag 40R, that is, a region on a right end 52*b* side of the left cowl cover portion 52L. Specifically, the right end side region 60 of the left cowl cover portion 52L is such that an end edge 60*a* (a right edge) is caused to neighbor the wiper pivot 12R when inflation is completed. In addition, the right end side region 60 is disposed in such a way as to coincide with the left end side region 55 of the right airbag 40R, while coming into contact therewith, on a lower side of the left end side region 55 (refer to FIGS. 9 and 10). In the same way as the left end side region 55 of the right cowl cover portion 52R in the right airbag 40R, the tether 69L is also disposed in a region of the right end side region 60 in the left cowl cover portion 52L. The tether 69L links the vehicle body side wall portion 40*a* and the pedestrian side wall portion 40*b*, and configures a thickness regulating member that regulates thickness when inflation is completed. The tether 69L disposed in the right end side region 60 is also disposed in such a way as to approximately follow the front-rear direction, in the same way as the tether 69R. Specifically, the tether 69L is disposed in a region that coincides vertically with the left end side region 55 of the right cowl cover portion 52R in the right airbag 40R when inflation is completed (refer to FIG. 10).

In the pedestrian protection device M of the embodiment, an amount by which the left cowl cover portions 52L and 52R coincide with each other (an amount by which the left end side region 55 and the right end side region 60 coincide) when inflation of the left airbag 40L and the right airbag 40R is completed is set to be in the region of 100 to 200 mm. In the embodiment, the right airbag device 20R, which is on the passenger seat side, is mounted in a position that is to the right of the wiper pivot 12R on the right side, in an approximate center in the vehicle width direction of the vehicle V. Further, the left airbag device 20L, which is on the driver's seat side, is of a configuration mounted in a position that is between the wiper pivots 12L and 12R, significantly farther to the left end side than the center in the vehicle width direction of the vehicle V. Because of this, in response to these kinds of mounting position, the lengths of the left cowl cover portion 52L of the left airbag 40L and the right cowl cover portion 52R of the right airbag 40R differ (refer to FIGS. 4 and 7). Further, the left airbag 40L is of a smaller capacity than the right airbag 40R by an amount commensurate with this kind of difference in length dimensions between the left cowl cover portion 52L and the right cowl cover portion 52R.

Figure 8:
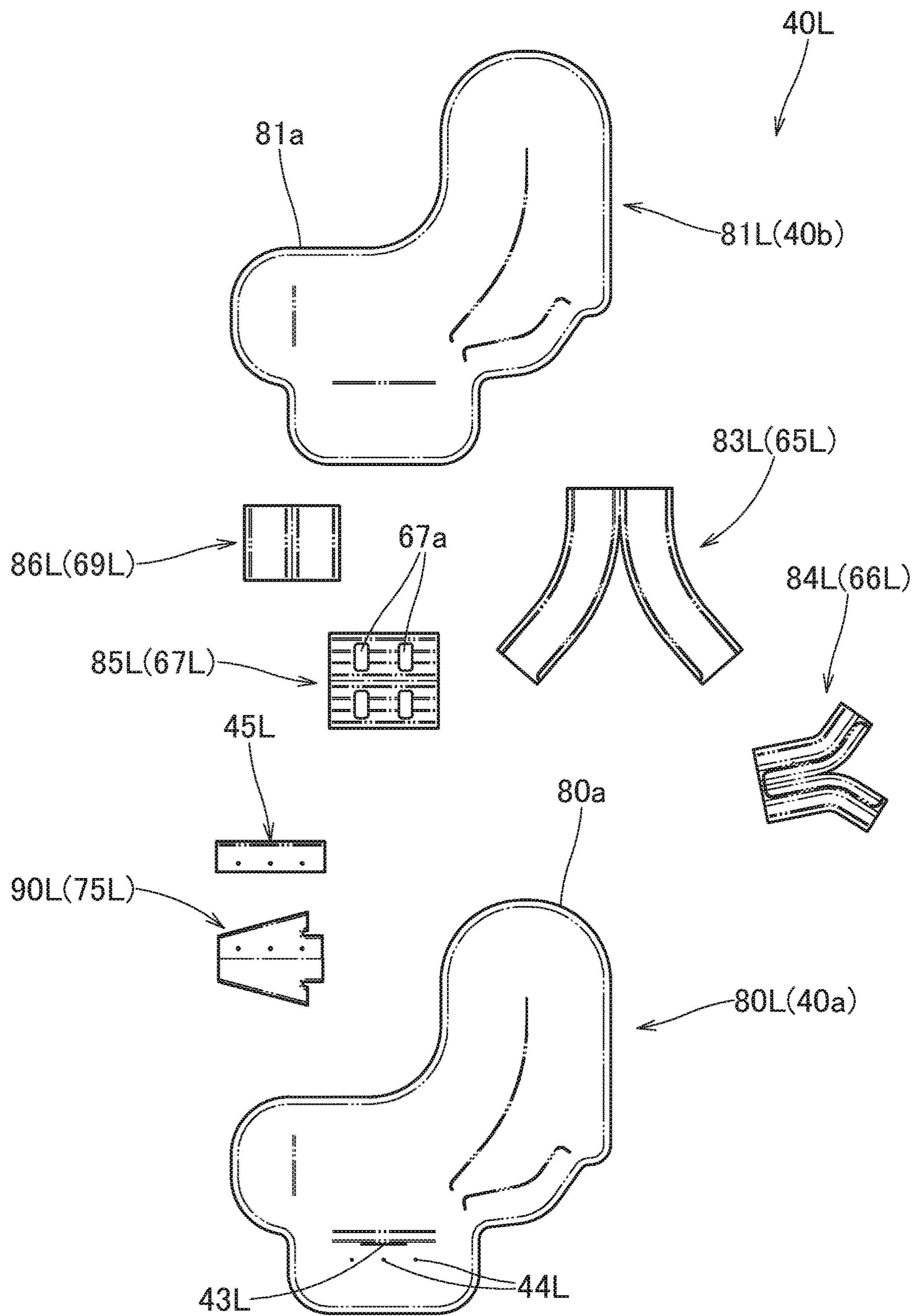
FIG. 8 is a plan view in which base members configuring the left airbag of FIG. 7 are arrayed.

As shown in FIG. 8, the left airbag 40L, in the same way as the right airbag 40R, is configured of a vehicle body side panel 80L configuring the vehicle body side wall portion 40*a*, a pedestrian side panel 81L configuring the pedestrian side wall portion 40*b*, tether base members 83L, 84L, 85L, and 86L configuring tethers 65L, 66L, 67L, and 69L respectively, and a tube base member 90L configuring an inner tube 75L.

A mounting of the pedestrian protection device M of the embodiment in the vehicle V will be described. Firstly, the right airbag 40R is folded in such a way that the right airbag 40R can be housed in the case 22R. The inflator 28R to which the attachment bracket 31R has been attached is inserted into the right airbag 40R, utilizing the insertion slit 43R, in a state inserted into the inner tube 75R. Further, the bolt 32R of each attachment bracket 31R protruding from an attachment hole (reference sign omitted) of the inner tube 75R is caused to protrude from the insertion hole 44R of the right airbag 40R. Next, the cover panel 45R is closed in such a way as to cover the insertion slit 43R, and each of the bolt 32R is inserted through the attachment hole 45*a*. Subsequently, the right airbag 40R and the inflator 28R are housed in the case 22R. The right airbag device 20R is assembled by attaching the airbag cover 26R to the case 22R. Next, the case 22R is disposed in a predetermined position in the vehicle V. Each of the bolts 32R protruding from the case 22R is fastened to the attachment portion 2R using the nut 33R. The right airbag device 20R can be mounted in the vehicle V by connecting the inflator 28R to an unshown operation circuit. By assembling the left airbag device 20L and mounting the left airbag device 20L in the vehicle V in the same way, the pedestrian protection device M can be mounted in the vehicle V.

In the pedestrian protection device M of the embodiment, when an unshown operation circuit detects a collision between the vehicle V and a pedestrian based on an operation signal from an unshown sensor disposed in the front bumper 3, each inflator 28L and 28R is operated. Further, the right airbag 40R and the left airbag 40L expand owing to inflating gas being caused to flow into the interior. The right airbag 40R expands in such a way as to cover a region that is roughly a right half of the cowl 6, and the lower portion 5*a* side of the front face of the front pillar 5R on the right side. The left airbag 40L expands in such a way as to cover a region that is roughly a left half of the cowl 6, and the lower portion 5*a* side of a front face of a front pillar 5L on the left side (refer to a two-dot chain line in FIG. 1 and to FIG. 9).

Further, in the pedestrian protection device M of the embodiment, the left airbag 40L and the right airbag 40R are of configurations that expand on the left and the right respectively of the wiper pivot 12R. The left airbag 40L and the right airbag 40R respectively include the left cowl cover portion 52L and the right cowl cover portion 52R, which cover the upper face side of the cowl 6 when inflation is completed. Further, in the inflated left cowl cover portion 52L and the right cowl cover portion 52R, the left end side region 55 and the right end side region 60 coming into proximity to each other come into contact in a position above the wiper pivot 12R. Because of this, the upper face side of the cowl 6 can be smoothly and extensively covered by the two cowl cover portions 52L and 52R, without being affected by the wiper pivot 12R partially protruding above the upper face of the cowl 6. In particular, in the pedestrian protection device M of the embodiment, although the left airbag 40L and the right airbag 40R are of configurations that expand while protruding from the cases 22L and 22R which are positioned lower than the upper face of the cowl 6, the left cowl cover portion 52L and the right cowl cover portion 52R are not affected by the wiper pivot 12R partially protruding above the upper face of the cowl 6. Also, in the pedestrian protection device M of the embodiment, the left end side region 55 of the right cowl cover portion 52R of the right airbag 40R is of a configuration that covers the wiper pivot 12R from above in such a way as to be able to restrict contact between a pedestrian and the wiper pivot 12R when inflation is completed. This means that even when a protection region is of an aspect such as to be divided in a proximity of a disposition region of the wiper pivot 12R, two cowl cover portions 52L and 52R can reliably protect the pedestrian from the wiper pivot 12R.

Consequently, in the pedestrian protection device M of the embodiment, even when adopting a configuration including the left airbag 40L and the right airbag 40R such that expand on the left and the right of the wiper pivot 12R disposed centrally in the vehicle width direction, the upper face side of the cowl 6 can be reliably and extensively covered when inflation of the left airbag 40L and the right airbag 40R is completed.

Figure 11:
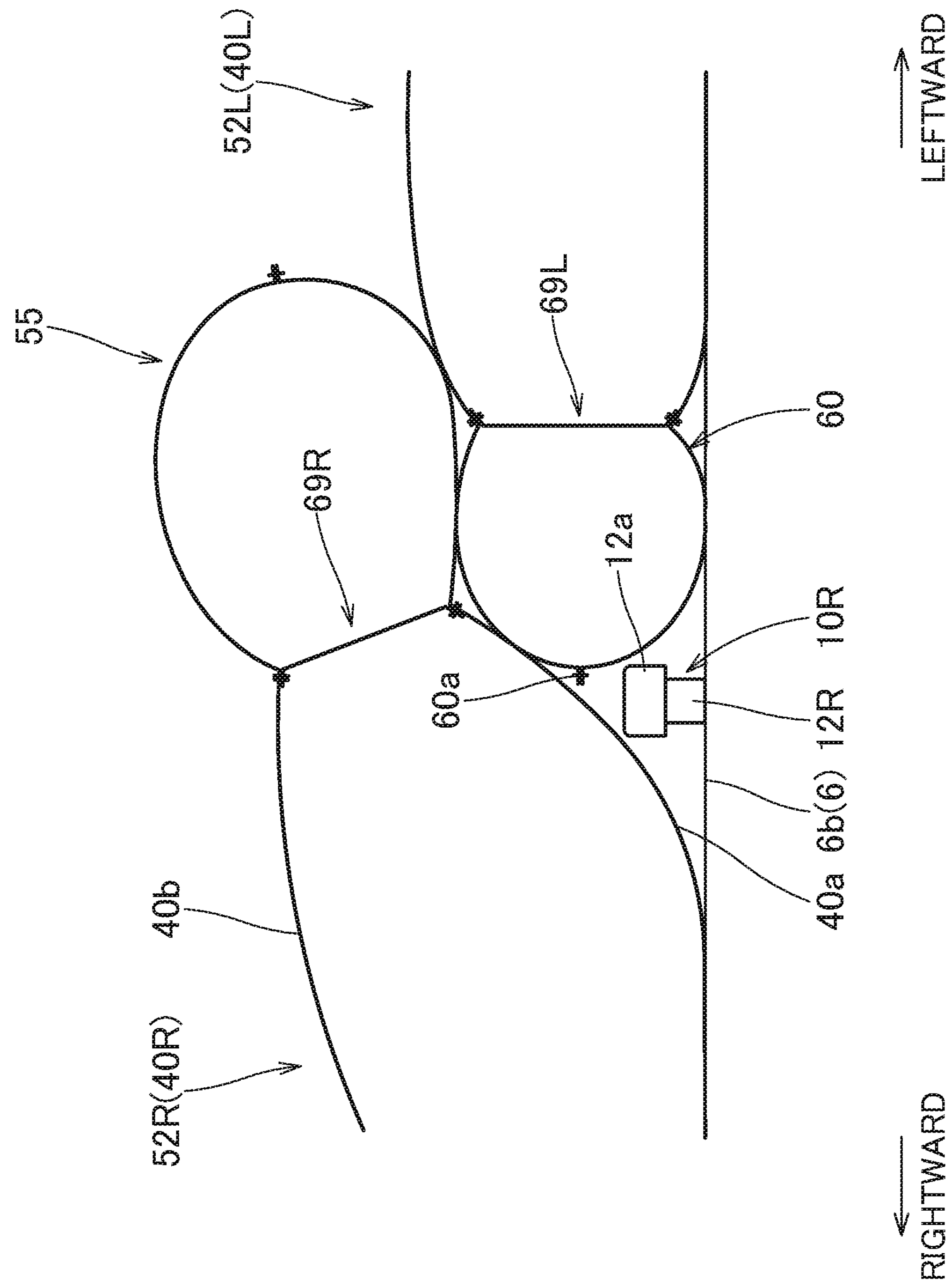
FIG. 11 is a schematic sectional view showing a region of end side regions that coincide with each other when inflation of the left airbag and the right airbag is completed in the pedestrian protection device of the embodiment.

Also, in the pedestrian protection device M of the embodiment, the right end side region 60 of the left cowl cover portion 52L of the left airbag 40L is of a configuration, as a lower end side region, such that the end edge 60*a* is caused to neighbor the wiper pivot 12R. Further, the left end side region 55 of the right cowl cover portion 52R of the right airbag 40R is configured in such a way as to cover from above a region from the wiper pivot 12R to the right end side region 60, as an upper end side region. Because of this, an aspect is such that the wiper pivot 12R is disposed in a recessed region occurring between the end edge 60*a* of the right end side region 60 and the lower face side of the left end side region 55 in a region, in which the right end side region 60 and the left end side region 55 coincide vertically when inflation of the left airbag 40L and the right airbag 40R is completed (refer to FIG. 11). As a result, interference between the left end side region 55 disposed on the upper side and the wiper pivot 12R can be restricted, and the left end side region 55 can be restricted from rising up more than necessary. Also, the left end side region 55 is disposed in such a way as to cover from above a region from the wiper pivot 12R to the right end side region 60. That is, the left end side region 55 is of an aspect such that the lower face side is supported by the right end side region 60. In still other words, a region that expands thickly in such a way that the right end side region 60 and the left end side region 55 are caused to coincide vertically is caused to neighbor the wiper pivot 12R when inflation of the left airbag 40L and the right airbag 40R is completed. This means that even when an aspect is such that a pedestrian comes into contact with a region in a vicinity of the wiper pivot 12R when inflation of the left airbag 40L and the right airbag 40R is completed, the contact between the pedestrian and the wiper pivot 12R can be reliably restricted by the left end side region 55 acting as an upper end side region and the right end side region 60 acting as a lower end side region.

Furthermore, in the pedestrian protection device M of the embodiment, the tethers 69L and 69R are disposed as thickness regulating members in interiors of regions disposed coinciding on up-down direction sides in the left end side region 55 and the right end side region 60 respectively. Each of the tethers 69L and 69R links the vehicle body side wall portion 40*a* and the pedestrian side wall portion 40*b*. That is, owing to the tethers 69L and 69R being disposed in the interiors, the left end side region 55 and the right end side region 60 are restricted from expanding to an excessive thickness, and are of an approximate plate form when inflation is completed. Because of this, the left end side region 55 and the right end side region 60 can be disposed in such a way as to extensively coincide on the up-down direction sides when inflation is completed. As a result, the wiper pivot 12R can be more stably extensively covered from above by the left end side region 55. When such a point is not taken into consideration, a configuration in which a thickness regulating member such that links a vehicle body side wall portion and a pedestrian side wall portion is not disposed in interiors of a left end side region (an upper end side region) and a right end side region (a lower end side region) may be adopted.

Figure 12:
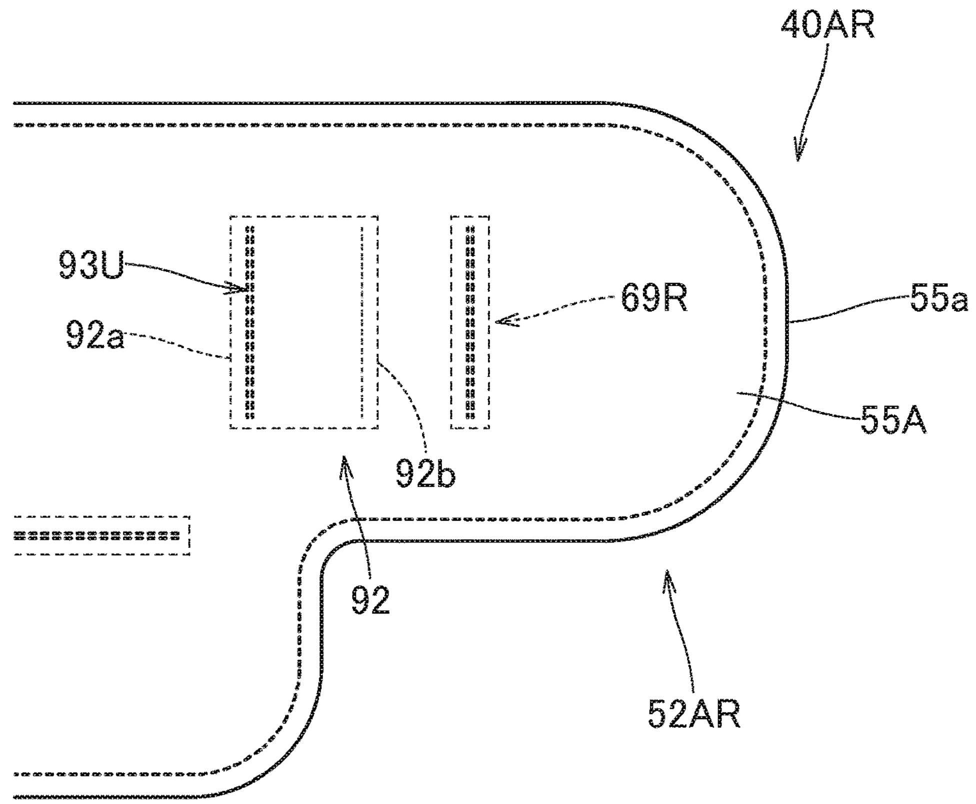
FIG. 12 is a partial enlarged plan view showing a region of a left end side region in a flattened state in a right airbag that is another embodiment of the present disclosure.
Figure 13:
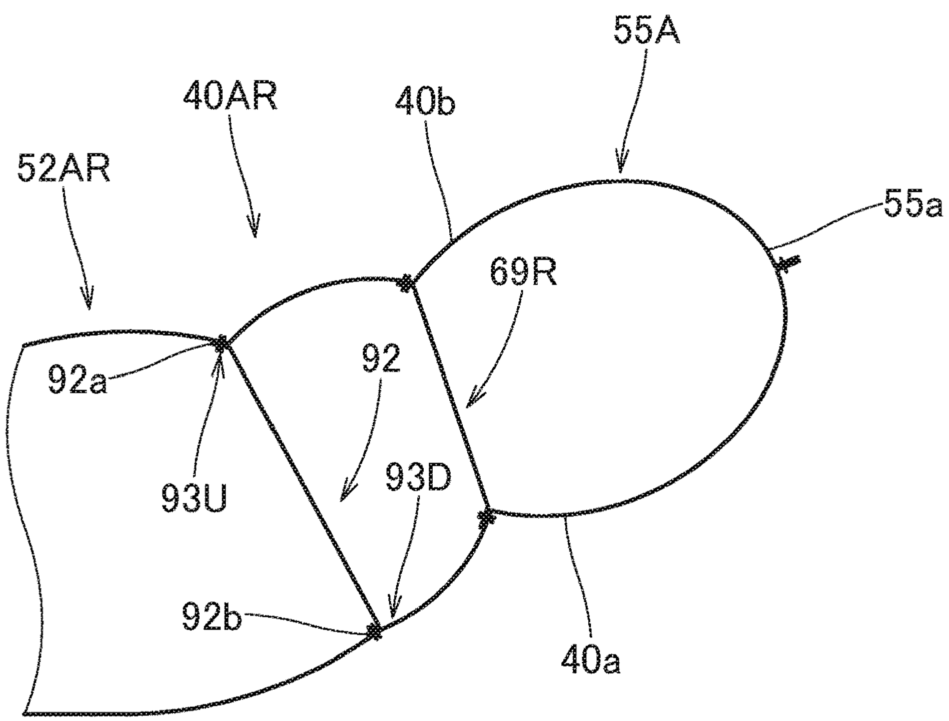
FIG. 13 is a schematic partial enlarged sectional view of a state in which the right airbag of FIG. 12 is inflated individually.
Figure 14:
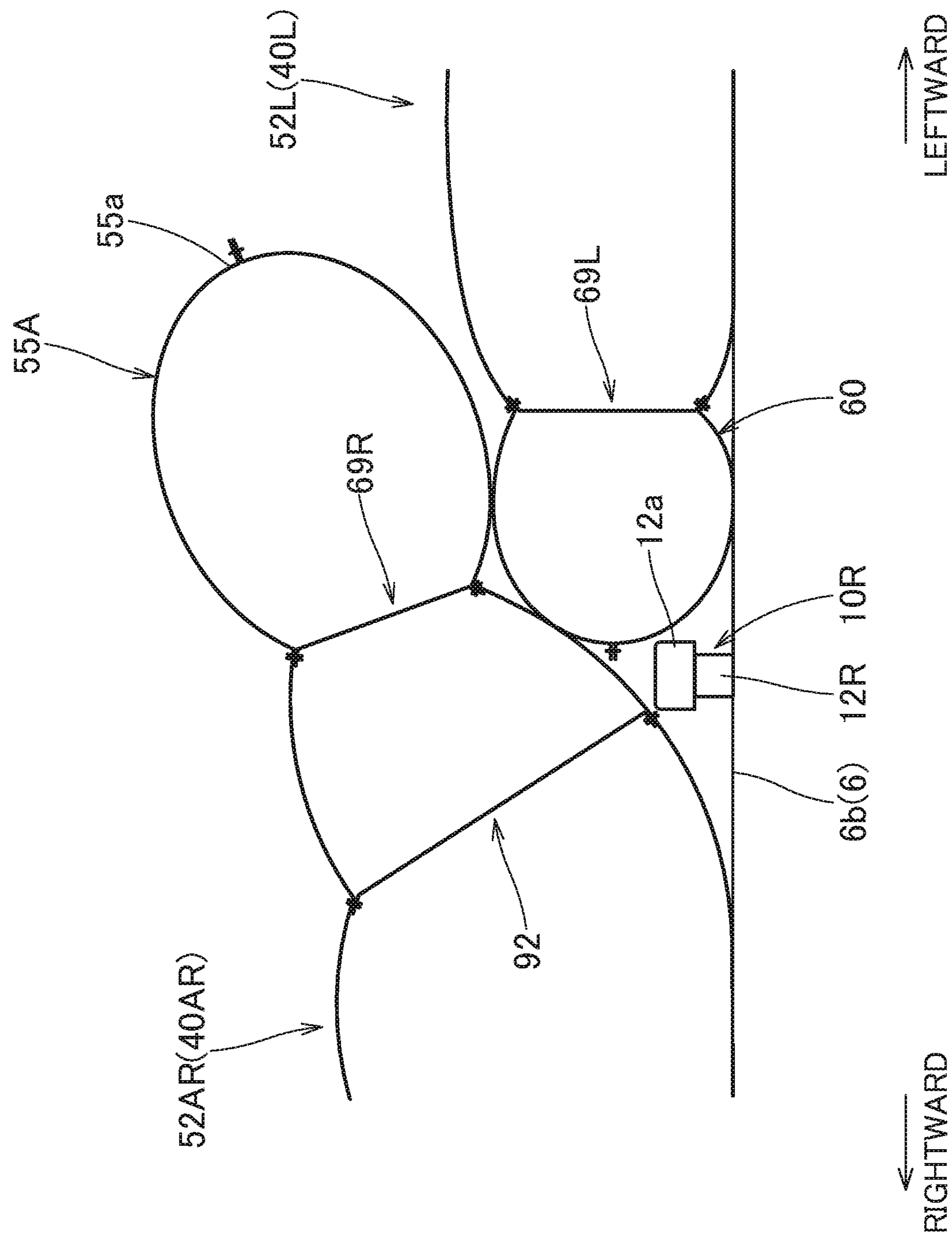
FIG. 14 is a schematic sectional view showing a region of end side regions that coincide with each other when inflation of the right airbag of FIG. 12 and the left airbag is completed.

Also, an airbag of a configuration such as that shown in FIGS. 12 and 13 may be used as a right airbag 40AR. A form regulating tether 92 such that can lift an end edge 55*a* of a left end side region 55A upward when inflation is completed is disposed in an interior of a right cowl cover portion 52AR of the right airbag 40AR. The thickness regulating tether 69R is also disposed in the interior of the right cowl cover portion 52AR. The form regulating tether 92 is of a strip form approximately following the front-rear direction, in the same way as the tether 69R. The form regulating tether 92 is disposed in a position to the right of the left end side region 55A (farther to the right than the wiper pivot 12R when mounted in a vehicle). Specifically, the form regulating tether 92 is configured as indicated below. A joint region 93U, in which an upper side edge portion 92*a* of the form regulating tether 92 is joined to the pedestrian side wall portion 40*b*, is positioned farther to the right than a joint region 93D, in which a lower side edge portion 92*b* of the form regulating tether 92 is joined to the vehicle body side wall portion 40*a*, in a state in which the right airbag 40AR is flattened. The form regulating tether 92 is disposed inclined in such a way that the upper side edge portion 92*a* is positioned farther to the right than the lower side edge portion 92*b* when inflation of the right airbag 40AR is completed. Further, the right cowl cover portion 52AR is of an aspect such as to be bent, with the upper side edge portion 92*a* (the joint region 93U) as an origin. As a result, the left end side region 55A is disposed inclined with respect to a horizontal direction in such a way that the end edge 55*a* is lifted up. When this kind of configuration is adopted for the right airbag 40AR, the left end side region 55A (an upper end side region) rises up easily when the left airbag 40L and the right airbag 40AR are inflating. That is, the left end side region 55A is easily disposed in such a way as to cover the upper side of the right end side region 60 (the lower end side region) (refer to FIG. 14).

Figure 15:
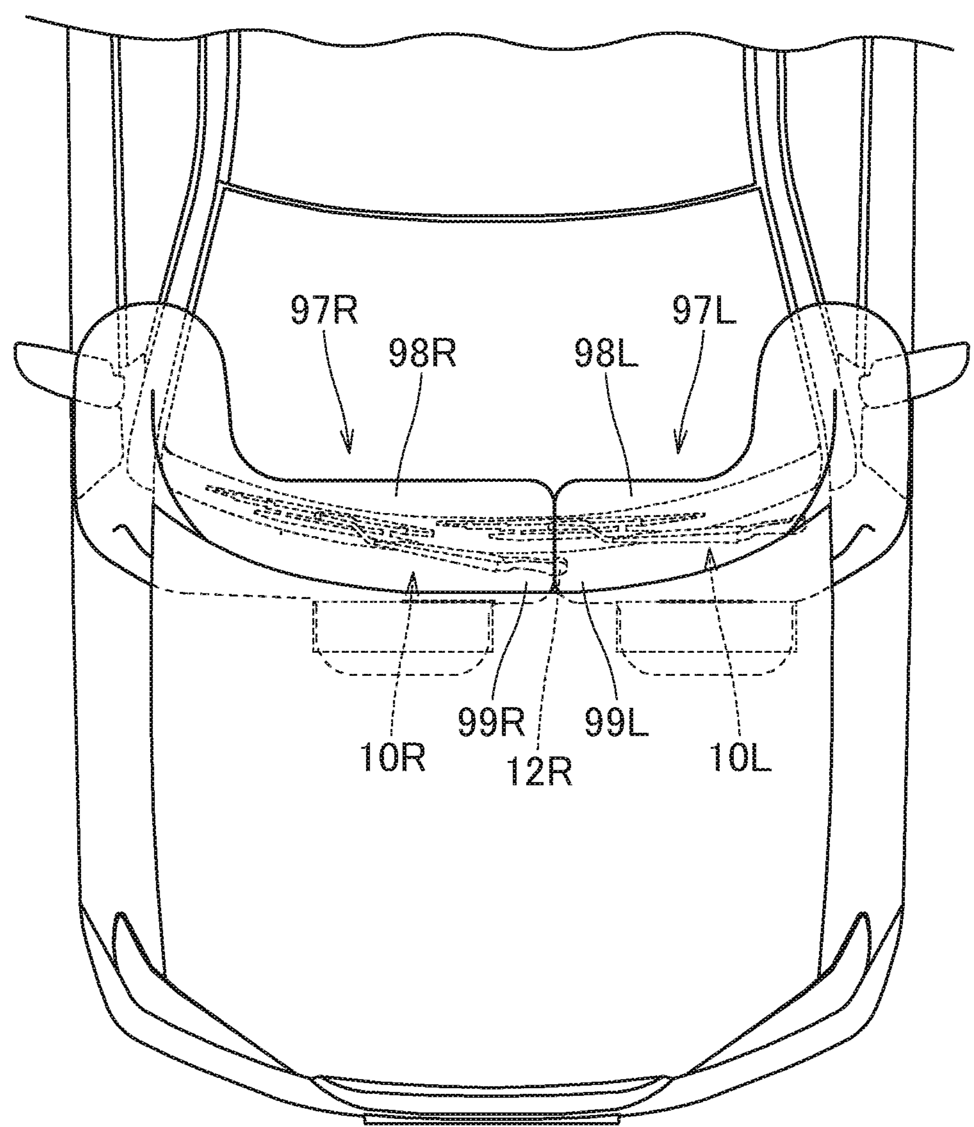
FIG. 15 is a plan view of a vehicle showing a state in which inflation of a left airbag and a right airbag that are still another embodiment of the present disclosure is completed.
Figure 16:
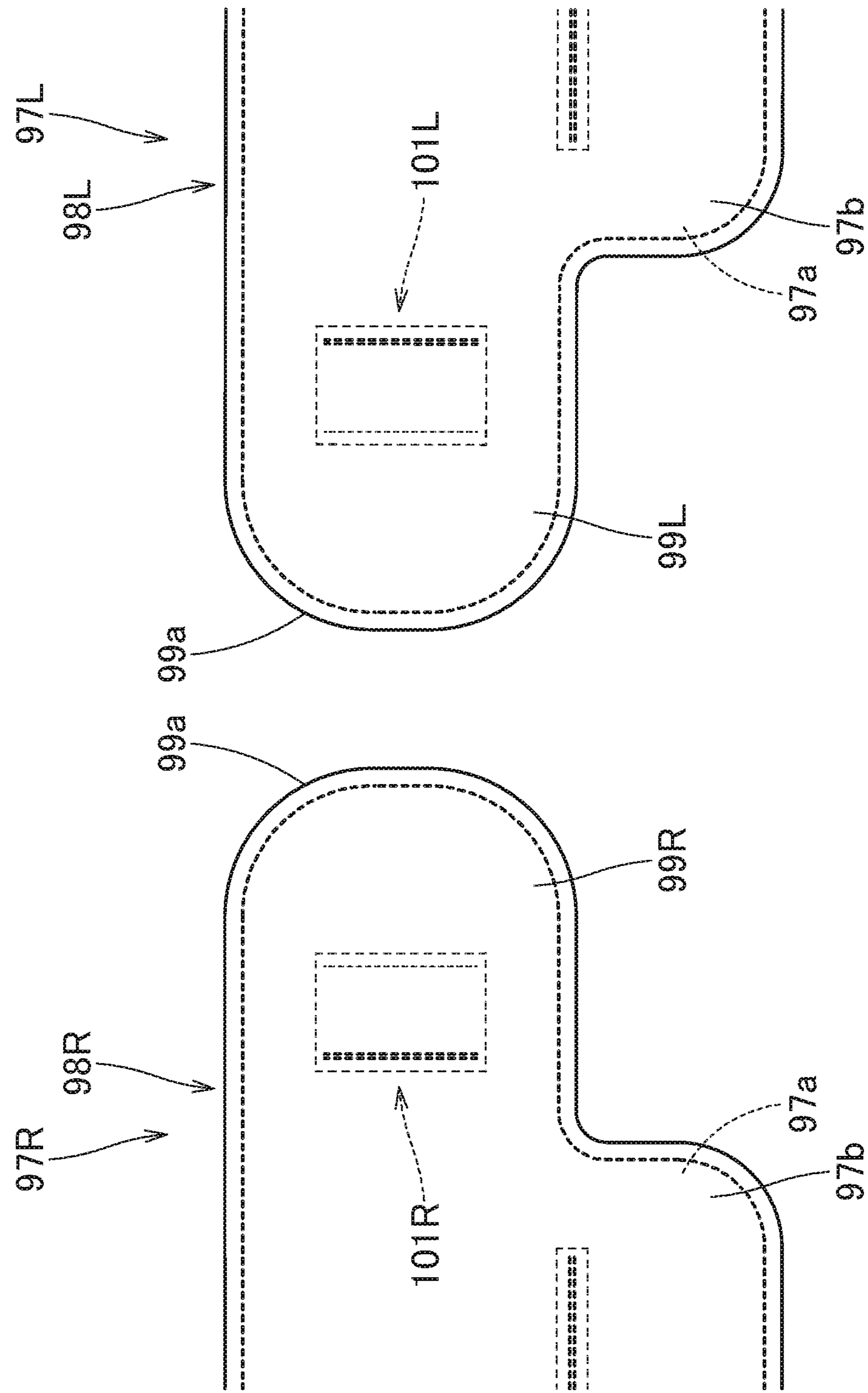
FIG. 16 is a schematic partial enlarged plan view of a state in which the left airbag and the right airbag of FIG. 15 are flattened.
Figure 17:
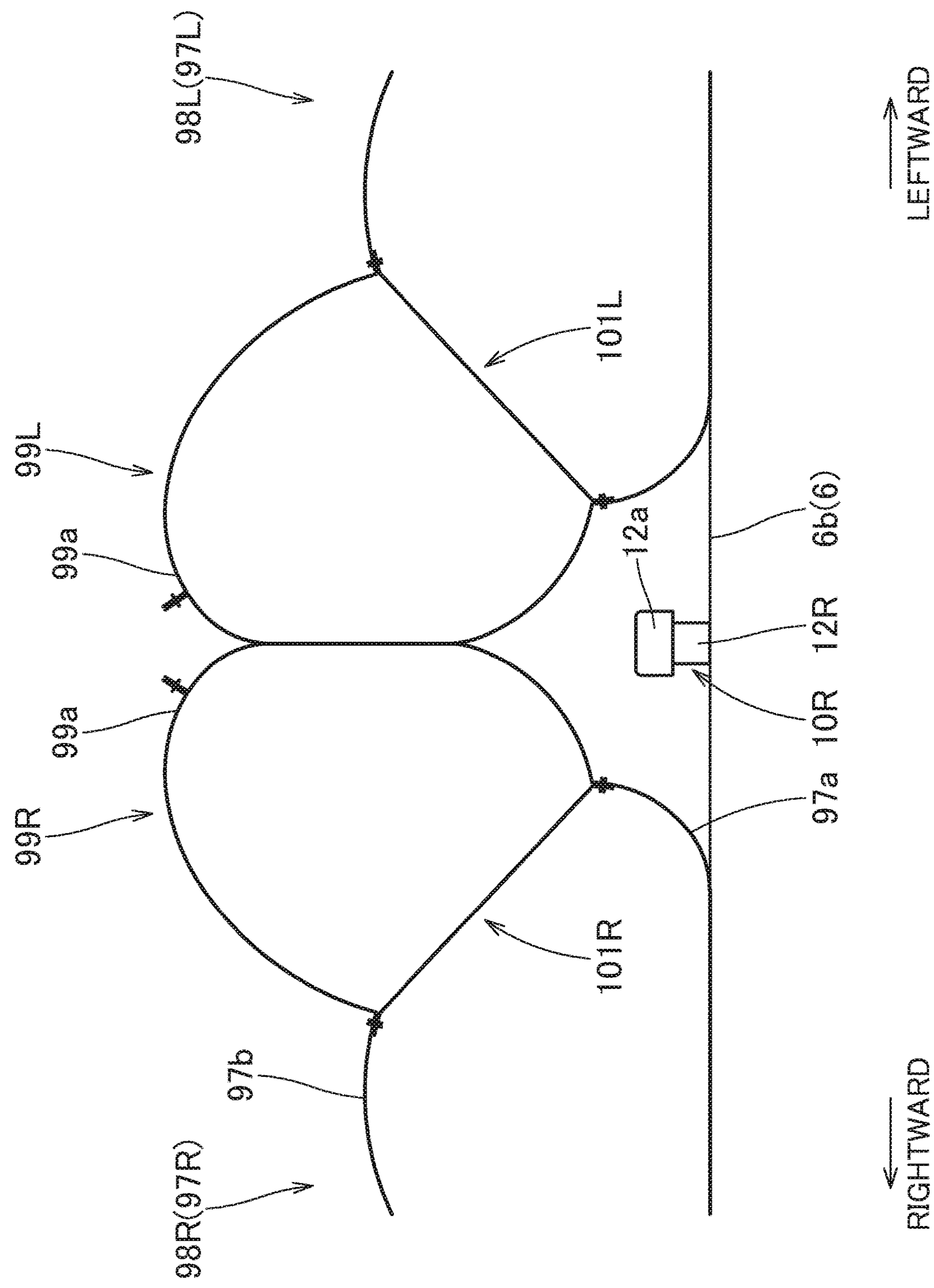
FIG. 17 is a schematic sectional view showing a region of end side regions when inflation of the right airbag and the left airbag of FIG. 15 is completed.

Furthermore, a left airbag 97L and a right airbag 97R may be of a configuration such as that shown in FIGS. 15 and 16. Cowl cover portions 98L and 98R in the left airbag 97L and the right airbag 97R are configured in such a way that regions in a vicinity of end sides on sides in proximity to each other (in a vicinity of end side regions 99L and 99R) have approximate bilateral symmetry, with the wiper pivot 12R as a center. Further, the end side regions 99L and 99R are of a configuration such as to come into contact in such a way as to press against each other in a position above the wiper pivot 12R when inflation is completed (refer to FIG. 17). The left airbag 97L, in the same way as the left airbag 40L, has a vehicle body side wall portion 97*a* and a pedestrian side wall portion 97*b* whose external forms are approximately identical. Further, the left airbag 97L is formed in a bag form by outer peripheral edges of the vehicle body side wall portion 97*a* and the pedestrian side wall portion 97*b* being sewn to each other. The right airbag 97R too, in the same way as the left airbag 97L, has the vehicle body side wall portion 97*a* and the pedestrian side wall portion 97*b*, whose external forms are approximately identical, and is formed in a bag form by outer peripheral edges of the vehicle body side wall portion 97*a* and the pedestrian side wall portion 97*b* being sewn to each other. Further, a form regulating tether 101L is disposed in a region of the end side region 99L of the left cowl cover portion 98L of the left airbag 97L. An end edge 99*a* of the end side region 99L is lifted upward by the form regulating tether 101L when inflation is completed. In the same way, a form regulating tether 101R is disposed in a region of the end side region 99R of the right cowl cover portion 98R of the right airbag 97R. The form regulating tethers 101L and 101R are of the same configuration as the form regulating tether 92 provided in the right airbag 40AR. Each of the end side regions 99L and 99R is disposed inclined in such a way that the end edge 99*a* is oriented upward when inflation is completed. Further, each of the end side regions 99L and 99R is disposed in such a way that regions of the vehicle body side wall portion 97*a* vertically interfere extensively and strongly with each other in a position above the wiper pivot 12R when inflation of the left airbag 97L and the right airbag 97R is completed (refer to FIG. 17). The left airbag 97L and the right airbag 97R are configured in such a way as to be able to realize this kind of state of strong interference between the end side regions 99L and 99R when inflation is completed. Specifically, although a detailed depiction is omitted, length dimensions (width dimensions between left-right direction sides) of the cowl cover portions 98L and 98R are set to be dimensions such that the end side regions 99L and 99R are caused to partially coincide with each other (such that an amount of protrusion from a case side region (reference sign omitted) is increased) when disposed in a flattened state in a vehicle mounting position. Also, length dimensions (width dimensions between left-right direction sides in a flattened state) of the form regulating tethers 101L and 101R are also set in such a way as to be able to realize a state of strong interference between the end side regions 99L and 99R when inflation is completed. Even when using the left airbag 97L and the right airbag 97R of this kind of configuration, a region above the wiper pivot 12R is covered by the two end side regions 99L and 99R. Further, the end side regions 99L and 99R come into contact in such a way as to press against each other. This means that even when a pedestrian comes into contact with this region, the contact between the pedestrian and the wiper pivot 12R can be reliably restricted by the two end side regions 99L and 99R. Furthermore, when this kind of configuration is adopted for a left airbag and a right airbag, a configuration such as that indicated below can be adopted, although a detailed depiction is omitted. By disposing a tether or the like in two end side regions as appropriate, a configuration such that irregularities that can be engaged with each other are provided can be adopted. When adopting this kind of configuration, a state of contact between end side regions when inflation of the left airbag and the right airbag is completed can be further strengthened, which is desirable.

The pedestrian protection device M of the embodiment is such that the length dimension of the right cowl cover portion 52R of the right airbag 40R disposed on the right side, which is the passenger seat side, is set to be greater than that of the left cowl cover portion 52L of the left airbag 40L disposed on the left side, which is the driver's seat side. Further, the left end side region 55 of the right airbag 40R is of a configuration that is caused to coincide with the upper side of the right end side region 60 of the left airbag 40L when inflation is completed. Of course, a pedestrian protection device of the present disclosure is not limited to the embodiment. An end side region of a cowl cover portion of an airbag disposed on a driver's seat side may be of a configuration that is caused to coincide with an upper side of an end side region of a cowl cover portion of an airbag disposed on a passenger seat side. However, an airbag on the driver's seat side needs to be housed in a case mounted in a region in a gap between wiper pivots of two wipers, and a large mounting space is difficult to secure in comparison with an airbag on the passenger seat side mounted in a region of side of a wiper pivot that is arranged in the center of a vehicle width direction. Because of this, adopting a configuration in which an airbag with a large capacity is mounted on the passenger seat side, where mounting space can easily be secured, is preferable. Also, in the embodiment, a pedestrian protection device is mounted in a left-hand drive vehicle, but the pedestrian protection device can, of course, be mounted in a right-hand drive vehicle in which the driver's seat is disposed on the right side. In the case of a right-hand drive vehicle, the left and right wipers are mounted in such a way as to be inverted left and right with respect to a left-hand drive vehicle. Further, when adopting a configuration in which end side regions are disposed in such a way as to coincide with each other vertically, a configuration is preferably such that a cowl cover portion of an airbag disposed on the left side, which is a passenger seat side, is set to be long, and an upper end side region is provided in the cowl cover portion.

The present disclosure relates to a pedestrian protection device of the following configuration.

The pedestrian protection device includes:

a left airbag and a right airbag that are disposed in a vicinity of a rear end of a hood panel in a vehicle, and are arranged in parallel on vehicle width direction sides when inflation of each is completed, wherein the left airbag includes a left cowl cover portion that is disposed approximately following the vehicle width direction and covers an upper face side of a cowl when inflation is completed, and the right airbag includes a right cowl cover portion that is disposed approximately following the vehicle width direction and covers the upper face side of the cowl when inflation is completed, and wherein the left airbag and the right airbag are of configurations that expand on a left and a right of a wiper pivot disposed centrally in the vehicle width direction of a left and right pair of wipers, the left cowl cover portion and the right cowl cover portion are of a configuration such that end side regions on sides in proximity to each other are caused to come into contact in a position above the wiper pivot when inflation is completed, and the end side region of at least one of the left cowl cover portion and the right cowl cover portion is of a configuration that covers the wiper pivot from above in such a way as to be able to restrict contact between a pedestrian and the wiper pivot when inflation is completed.

In the pedestrian protection device of the present disclosure, a left airbag and a right airbag are of configurations that expand on a left and a right respectively of a wiper pivot. Each of the left airbag and the right airbag includes a cowl cover portion that covers an upper face side of a cowl when inflation is completed. Further, in the inflated cowl cover portions, end side regions on sides in proximity to each other are caused to come into contact in a position above the wiper pivot. Because of this, the upper face side of the cowl can be smoothly and extensively covered by the two cowl cover portions, without being affected by the wiper pivot which partially protrudes upward from the upper face of the cowl. Also, the end side region of at least one of the left cowl cover portion and the right cowl cover portion is of a configuration that covers the wiper pivot from above in such a way as to be able to restrict contact between a pedestrian and the wiper pivot when inflation is completed. This means that even when a protection region is of an aspect such as to be divided in a proximity of a disposition region of the wiper pivot, the two cowl cover portions can reliably protect the pedestrian from the wiper pivot.

Consequently, in the pedestrian protection device of the present disclosure, even when adopting a configuration including a left airbag and a right airbag such that expand on a left and a right of a wiper pivot disposed centrally in a vehicle width direction, an upper face side of a cowl can be reliably and extensively covered when inflation of the left airbag and the right airbag is completed.

Also, the pedestrian protection device of the present disclosure is preferably such that an end side region of one of the left cowl cover portion and the right cowl cover portion is of a configuration, as a lower end side region, such that an end edge is caused to neighbor the wiper pivot when inflation is completed, and an end side region of the other cowl cover portion is configured in such a way as to cover from above a region from the wiper pivot to the lower end side region as an upper end side region.

When adopting this kind of configuration for a pedestrian protection device, an aspect is such that the wiper pivot is disposed in a recessed region occurring between the end edge of the lower end side region and a lower face side of the upper end side region in a region, in which the lower end side region and the upper end side region coincide vertically when inflation of the left airbag and the right airbag is completed. As a result of this, interference between the upper end side region and the wiper pivot can be restricted, and the upper end side region can be restricted from rising up more than necessary. Also, the upper end side region is disposed in such a way as to cover from above a region from the wiper pivot to the lower end side region. That is, the upper end side region is of an aspect such that the lower face side is supported by the lower end side region. In still other words, a region that expands thickly in such a way that the lower end side region and the upper end side region are caused to coincide vertically is caused to neighbor the wiper pivot when inflation of the left airbag and the right airbag is completed. This means that even when an aspect is such that a pedestrian comes into contact with a region in a vicinity of the wiper pivot when inflation of the left airbag and the right airbag is completed, the contact between the pedestrian and the wiper pivot can be reliably restricted by the upper end side region and the lower end side region.

Furthermore, the pedestrian protection device of the heretofore described configuration is preferably such that the left airbag is of a configuration including a vehicle body side wall portion, which is disposed on a vehicle body side when inflation is completed, and a pedestrian side wall portion disposed on a pedestrian side; the right airbag is of a configuration including a vehicle body side wall portion, which is disposed on the vehicle body side when inflation is completed, and a pedestrian side wall portion disposed on the pedestrian side; and a thickness regulating member that regulates a thickness when inflation is completed by linking the vehicle body side wall portion and the pedestrian side wall portion is disposed in interiors of regions disposed coinciding on up-down direction sides when inflation is completed in the upper end side region and the lower end side region.

When adopting the heretofore described configuration for a pedestrian protection device, the upper end side region and the lower end side region are restricted from expanding to an excessive thickness owing to the thickness regulating member being disposed in the interiors, and are of an approximate plate form when inflation is completed. Because of this, the upper end side region and the lower end side region are disposed in such a way as to extensively coincide on the up-down direction sides when inflation is completed, and the wiper pivot can be more stably extensively covered from above by the upper end side region.

Further still, the pedestrian protection device of the heretofore described configuration is preferably such that the upper end side region is of a configuration that expands inclining in such a way that an end edge on the lower end side region side is lifted up. When this kind of configuration is adopted, the upper end side region is easily disposed in such a way as to cover the upper side of the lower end side region when the left airbag and the right airbag are expanding.

Also, the pedestrian protection device of the present disclosure may be such that the end side regions are of a configuration such as to come into contact in such a way as to press against each other in a position above the wiper pivot when inflation is completed. When adopting this kind of configuration, the wiper pivot is covered from above by the two end side regions, and the end side regions come into contact in such a way as to press against each other. This means that even when a pedestrian comes into contact with this region, the contact between the pedestrian and the wiper pivot can be reliably restricted.

What is claimed is:

1. A pedestrian protection device, comprising:

a left airbag and a right airbag that are disposed in a vicinity of a rear end of a hood panel in a vehicle, and are arranged in parallel on vehicle width direction sides when inflation of each is completed, wherein the left airbag includes a left cowl cover portion that is disposed approximately following the vehicle width direction and covers an upper face side of a cowl when inflation is completed, and the right airbag includes a right cowl cover portion that is disposed approximately following the vehicle width direction and covers the upper face side of the cowl when inflation is completed, and wherein the left airbag and the right airbag are of configurations that expand on a left and a right of a wiper pivot disposed centrally in the vehicle width direction of a left and right pair of wipers, the left cowl cover portion and the right cowl cover portion are of a configuration such that end side regions on sides in proximity to each other are caused to come into contact in a position above the wiper pivot when inflation is completed, and the end side region of at least one of the left cowl cover portion and the right cowl cover portion is of a configuration that covers the wiper pivot from above in such a way as to be able to restrict contact between a pedestrian and the wiper pivot when inflation is completed.

2. The pedestrian protection device according to claim 1, wherein an end side region of one of the left cowl cover portion and the right cowl cover portion is of a configuration, as a lower end side region, such as to cause an end edge when inflation is completed to neighbor the wiper pivot, and an end side region of the other of the left cowl cover portion and the right cowl cover portion is configured in such a way as to cover from above a region from the wiper pivot to the lower end side region, as an upper end side region.

3. The pedestrian protection device according to claim 2, wherein the left airbag includes a vehicle body side wall portion which is disposed on a vehicle body side when inflation is completed, and a pedestrian side wall portion disposed on a pedestrian side, the right airbag includes a vehicle body side wall portion which is disposed on the vehicle body side when inflation is completed, and a pedestrian side wall portion disposed on the pedestrian side, and a thickness regulating member that regulates a thickness when inflation is completed by linking the vehicle body side wall portion and the pedestrian side wall portion is disposed in interiors of regions which are disposed coinciding on up-down direction sides when inflation is completed, in the upper end side region and the lower end side region.

4. The pedestrian protection device according to claim 3, wherein the upper end side region is of a configuration that expands inclined in such a way that an end edge on the lower end side region side is lifted upward.

5. The pedestrian protection device according to claim 4, wherein a form regulating tether that regulates a form when inflation is completed by linking the vehicle body side wall portion and the pedestrian side wall portion is disposed in an interior of the upper end side region.

6. The pedestrian protection device according to claim 2, wherein the upper end side region is of a configuration that expands inclined in such a way that an end edge on the lower end side region side is lifted upward.

7. The pedestrian protection device according to claim 1, wherein the end side regions come into contact in such a way as to press against each other in a position above the wiper pivot when inflation is completed.

* * * * *